US007228077B2

(12) United States Patent
Newell et al.

(10) Patent No.: US 7,228,077 B2
(45) Date of Patent: Jun. 5, 2007

(54) CHANNEL GAIN CONTROL FOR AN OPTICAL COMMUNICATIONS SYSTEM UTILIZING FREQUENCY DIVISION MULTIPLEXING

(75) Inventors: Laurence J. Newell, Saratoga, CA (US); James F. Coward, La Honda, CA (US)

(73) Assignee: Forster Energy LLC, Las Vegas, NV (US)

( * ) Notice: Subject to any disclaimer, the term of this patent is extended or adjusted under 35 U.S.C. 154(b) by 869 days.

(21) Appl. No.: 09/854,153

(22) Filed: May 11, 2001

(65) Prior Publication Data

US 2002/0012493 A1    Jan. 31, 2002

Related U.S. Application Data

(63) Continuation-in-part of application No. 09/816,242, filed on Mar. 23, 2001, which is a continuation-in-part of application No. 09/571,349, filed on May 16, 2000, and a continuation-in-part of application No. 09/569,761, filed on May 12, 2000.

(60) Provisional application No. 60/273,833, filed on Mar. 6, 2001, provisional application No. 60/211,935, filed on Jun. 15, 2000, provisional application No. 60/209,020, filed on Jun. 1, 2000.

(51) Int. Cl.
*H04B 10/00* (2006.01)

(52) U.S. Cl. .................. 398/159; 398/141; 398/81

(58) Field of Classification Search .................. 398/13, 398/14, 15, 16, 28, 29, 30, 32, 34, 38, 158–162, 398/192–198, 81

See application file for complete search history.

(56) References Cited

U.S. PATENT DOCUMENTS

| 4,061,577 | A |   | 12/1977 | Bell ............................ 250/199 |
| 4,210,779 | A | * | 7/1980 | Simokat ..................... 370/488 |
| 4,701,904 | A |   | 10/1987 | Darcie ............................ 370/3 |
| 4,768,186 | A | * | 8/1988 | Bodell ......................... 398/76 |
| 4,800,555 | A | * | 1/1989 | Foschini ...................... 398/95 |
| 4,953,156 | A |   | 8/1990 | Olshansky et al. ............ 370/3 |
| 5,020,049 | A | * | 5/1991 | Bodeep et al. ............... 398/76 |
| 5,060,310 | A | * | 10/1991 | Frisch et al. ................ 398/193 |

(Continued)

FOREIGN PATENT DOCUMENTS

EP    0 717 521 A    6/1996

(Continued)

OTHER PUBLICATIONS

Jones-Bey, H., "Optical switches pursue crossconnect markets," *Laser Focus World*, May 1998, pp. 153-162.

(Continued)

*Primary Examiner*—Agustin Bello

(57) ABSTRACT

Attenuation caused by dispersion in an optical fiber communications system is compensated. A number of low-speed channels is to be transmitted across an optical fiber. Each low-speed channel is allocated a different frequency band for transmission. The attenuation caused by dispersion is estimated for each of the frequency bands. The power of each low-speed channel is adjusted to compensate for the estimated attenuation. The power-adjusted low-speed channels are frequency division multiplexed together to produce an electrical high-speed channel suitable for transmission across the communications system.

12 Claims, 17 Drawing Sheets

U.S. PATENT DOCUMENTS

| | | | |
|---|---|---|---|
| 5,339,184 A | 8/1994 | Tang | |
| 5,351,148 A * | 9/1994 | Maeda et al. | 398/76 |
| 5,387,927 A | 2/1995 | Look et al. | 348/6 |
| 5,430,568 A | 7/1995 | Little et al. | 359/124 |
| 5,459,607 A | 10/1995 | Fellows et al. | |
| 5,461,612 A | 10/1995 | Göckler et al. | 370/55 |
| 5,481,542 A | 1/1996 | Logston et al. | |
| 5,559,561 A | 9/1996 | Wei | 348/470 |
| 5,576,874 A | 11/1996 | Czerwiec et al. | 359/123 |
| 5,596,436 A | 1/1997 | Sargis et al. | 359/132 |
| 5,610,748 A | 3/1997 | Sakanaka et al. | |
| 5,612,806 A | 3/1997 | Su et al. | |
| 5,678,198 A * | 10/1997 | Lemson | 455/67.11 |
| 5,680,238 A | 10/1997 | Masuda | 359/132 |
| 5,832,387 A * | 11/1998 | Bae et al. | 455/522 |
| 5,878,088 A | 3/1999 | Knutson et al. | 375/324 |
| 5,956,165 A | 9/1999 | Fee et al. | 359/118 |
| 6,078,412 A | 6/2000 | Fuse et al. | 359/124 |
| 6,118,566 A | 9/2000 | Price | 359/181 |
| 6,160,649 A | 12/2000 | Horiuchi et al. | |
| 6,236,726 B1 * | 5/2001 | Darveau | 379/417 |
| 6,271,942 B1 * | 8/2001 | Sasai et al. | 398/9 |
| 6,289,511 B1 | 9/2001 | Hubinette | |
| 6,430,148 B1 | 8/2002 | Ring | |
| 6,529,303 B1 | 3/2003 | Rowan et al. | |
| 6,603,822 B2 | 8/2003 | Brede et al. | |
| 6,643,470 B1 | 11/2003 | Iida et al. | |

FOREIGN PATENT DOCUMENTS

| | | |
|---|---|---|
| EP | 0 756 393 A1 | 1/1997 |
| JP | 09022038 A | 1/1997 |
| JP | 09098155 A | 4/1997 |

OTHER PUBLICATIONS

Kanno, N., K. Ito, "Fiber Optic Subcarrier Multiplexing Transport for Broadband Subscriber Distribution Network", *IEEE Intl. Conference on Communications Boston ICC/89 World Prosperity Through Communications*, Jun. 11-14, 1989, Boston, MA, vol. 2, pp. 996-1003.

Kavehrad, M., E. Savov, "Fiber-Optic Transmission of Microwave 64-QAM Signals", IEEE Journal on Selected Areas in Communications, vol. 8, No. 7, Sep. 1990, pp. 1320-1326.

Kitayama, Ken-ichi, "Subarrier Multiplexing Based Signaling and Access Control in Optical FDM Networks", IEEE Global Telecomuunications Conference (GLOBECOM'95, Singapore), Nov. 1995, pp. 1996-2002.

LeBer, J., M. LeLigne, "Digital Transmission on Electric Subcarriers in Optical Fiber Videoommunication Systems", *Optics Communications*, Oct. 15, 1987, vol. 64, No. 2, pp. 120-126.

Li, J., K. Yano, "Development of AM/QAM Hybrid Optical SCM Transmission System", *Proc Intl Conf. On Communication Technology ICCT '96*, May 5-7, 1996, Beijing, China, vol. 1, pp. 575-577.

Lu, X., G.E. Bodeep, T.E. Darcie, "Broad-Band AM-VSB/64 QAM Cable TV System Over Hybrid Fiber/Coax Network," IEEE Photonics Technology Letters, vol. 7, No. 4, Apr. 1995, pp. 330-332.

Nakamura, Y., H. Ohtsuka, S. Aikawa, H. Takanashi, "Advanced Techniques for Super Multi-Carrier Digital Microwave Radio With Trellis-Coded 256 QAM Modulation", NTT Radio Communication Systems Laboratories), pp. 389-394.

Nishikido, J. et al., "Multiwavelength Securely-Authenticated Broadcast Network" 11th International Conference on Integrated Optics and Optical Fibre Communications, 23rd European Conference on Optical Communications IOOC-ECOC 97 (Conf. Publ. No. 448), Sep. 22, 1997, pp. 17-20.

Nortel, "S/DMS Transport Node OC-192 System," Issue 1, Sep. 25, 1995, pp. 1-25.

Ohtsuka, H., O. Kagami, S. Aikawa, H. Takanashi, "256-QAM Subcarrier Transmission for Broadband Distribution Networks", NTT Radio Communications Systems Laboratories, GlobeCom '91, pp. 1817-1822.

Cambrian Systems Corporation, "OPTera Metro Optical Networking Platform Product Information," copyright 1997 (printed from http://www.cambriansys.com/productinfo.htm on May 24, 1999), pp. 1-4.

Dai, H., C. Lin, M. Ramachandran, "Hybrid AM/QAM Video Trunking Lightwave Systems With Cascaded EDFAs", *Conf. Proc. LEOS, 97 Annual Meeting, IEEE Lasers & Electro Optic Society*, 1997, vol. 1, pp. 319-320.

Douverne, E., M. Ottka, K. Ruthemann, K. Siegel, "Ein 64-QAM-Modem Für SDH-Richtfunkgeräte mit intergriertem Kreuzpolarisationsentkoppler", vol. 40, No. 11, Mar. 1, 1994, pp. 89-100.

Fujitsu Network Communications, Inc., "Flash-192 Fujitsu Lightwave Add/Drop Multiplexer," copyright 1997 (printed from http://www.fnc.fujitsu.com/technology/falsh192.htm on May 24, 1999), pp. 1-4.

Fuse, M., Y. Kudo, K. Maeda, "Development of 128 Optical Distribution System of 150 chs AM/QAM Hybrid Signals", *Electronics and Communications in Japan*, Nov. 1996, vol. 79, Issue 11, Part 1, pp. 65-77.

Green, P., "Fiber Optic Networks", 1993, Prentice-Hall, Inc., Englewood Cliffs, New Jersey, p. 331, line 4—line 7, figure 9-1.

Hiramatsu, A. et al., "Hypermedia Photonic Information Network Based on WDM-SCM Broadcast and Select Switching," Conference Proceedings, Leos '96 9th Annual Meeting, IEEE Lasers and Electro-Optics Society 1996 Annual Meeting (Cat. No. 96CH35895), Boston, MA, Nov. 18-19, 1996, pp. 312-313.

Hitachi Telecom (USA) Inc., "OC-192 AMN5192 Sonet Node," Jul. 1998, pp. 1-2.

Ho, K., H. Dai, C. Lin, "Hybrid WDM Digital Trunking System for both HFC and FTTC Access Networks", Digest IEEE/LEOS 1996 Summer Topical Meetings (Cat. No. 96th 8164), NY, NY, pp. 37-38.

I-Cube, "Designing a Large Crosspoint With Fast Reconfiguration", Literature #D-22-013, Sep. 1997, pp. 1-9.

I-Cube, "Optimal I/O Assignment in an IQX-based Crossbar Switch", Literature #D-21-019, Sep. 1997, pp. 1-14.

I-Cube, "IQX Family Data Sheet", Jan. 1999, pp. 1-58.

Alcatel, "Alcatel 1680 SM 10 Gbps (STM-64) Add Drop Multiplexer", copyright 1997 (printed from http://www.alcatel.com/telecom/mbd/products/products/1680sm.htm on May 24, 1999), pp. 1-4.

Alcatel, "Alcatel 1692 SM 10 Gbps (OC-192) SONET Transport System", copyright 1997 (printed from http://www.alcatel.com/telecom/mbd/products/products/1692.htm on May 24, 1999), pp. 1-2.

Alcatel, "The OPTINEX Family of Network Elements", copyright 1997 (printed from http://www.alcatel.com/telecom/tsd/products/family.htm on May 24, 1999), pp. 1-7.

Business Wire, "Harmonic Lightwaves Annouces Availability of First MCNS-Compliant QAM Modulator; TRANsend QAM is a Vital Component for Delivering Digital Services", Nov. 18, 1997.

Park, J., A. Elrefaie, K. Lau, "1550-nm Transmission of Digitally Modulated 28-GHz Subcarriers Over 77 km of Nondispersion Shifted Fiber", *IEEE Photonics Technology Letters*, Feb. 1997, vol. 9, Issue 2, pp. 256-258.

Ryan, J., "WDM: North American Deployment Trends," *IEEE Communications Magazine*, Feb. 1998, pp. 40-44.

Schlump, Dieter et al.: "Electronic equalization of PMD and chromatic dispersion induced distortion after 100 km standard fibre at 10 Gbit/s" Proceedings of the European Conference on Optical Communication, Sep. 20, 1998, pp. 535-536.

Swaminathan, V., N. Froberg, L. Upadhyayula, "The end-to-end bit error performance of 64-quadrature amplitude modulated signals in a hybrid AM-vestigial sideband/QAM fiber-optic video transmission system", *Proceedings of SPIE-International Society for Optical Engineering*, vol. 2917, pp. 274-282.

Tai, C., Pi-Yang Chiang, W. Way, "Eight-Way, 70-km Transmission of 33-Channel 64-QAM Signals Utilizing a 1-3-μm External Modulation System and Semiconductor Optical Amplifier", *IEEE Photonics Technology Letters*, vol. 8, No. 9, Sep. 1996, pp. 1244-1248.

Tang, D., "Multi-Gigabit Fiber-Optic Video Distribution Network Using BPSK Microwave Subcarriers", IEEE 1989 MTT-S Intl. Microwave Symp Digest, Jun. 13-15, 1989, Long Beach, CA, vol. 2, pp. 697-701.

Wilson, G. "Capacity of QAM SCM systems utilising optically linearised Mach-Zehnder modulator as transmitter", Electronic Letters, vol. 34, No. 25, Dec. 10, 1998, pp. 2372-2374.

Blumenthal, Daniel J. et al., "Fiber-Optic Links Supporting Baseband Data and Subcarrier-Multiplexed Control Channels and the Impact of MMIC Photonic/Microwave Interfaces," *IEEE Transactions on Microwave Theory and Techniques* (Aug. 1997), vol. 45, No. 8, pp. 1443-1451.

Liew, Soung C. et al., "A Broad-Band Optical Network Based on Hierarchical Multiplexing of Wavelengths and RF Subcarriers," *Journal of Lightwave Technology* (Nov. 1989), vol. 7, No. 11, pp. 1825-1838.

* cited by examiner

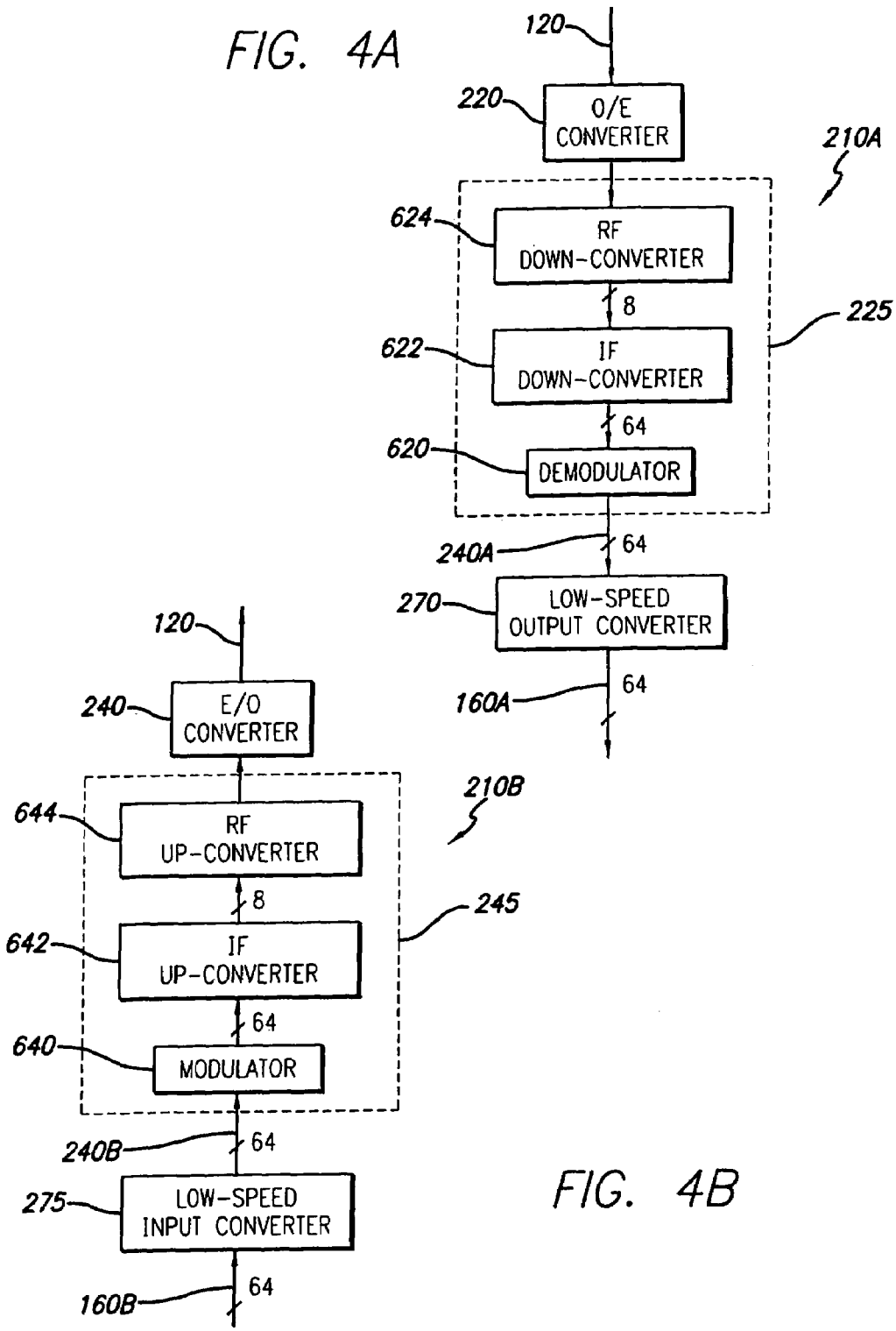

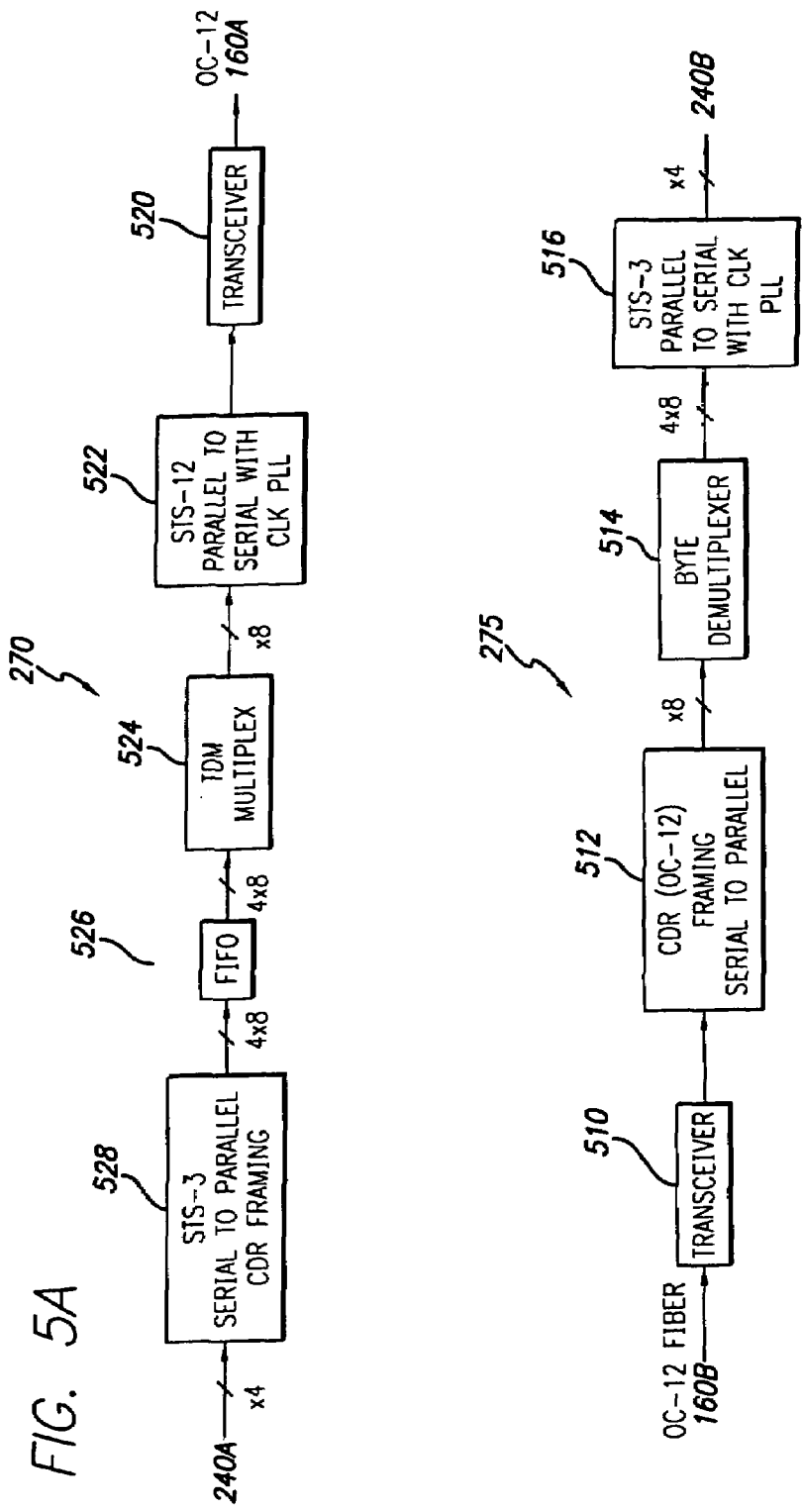

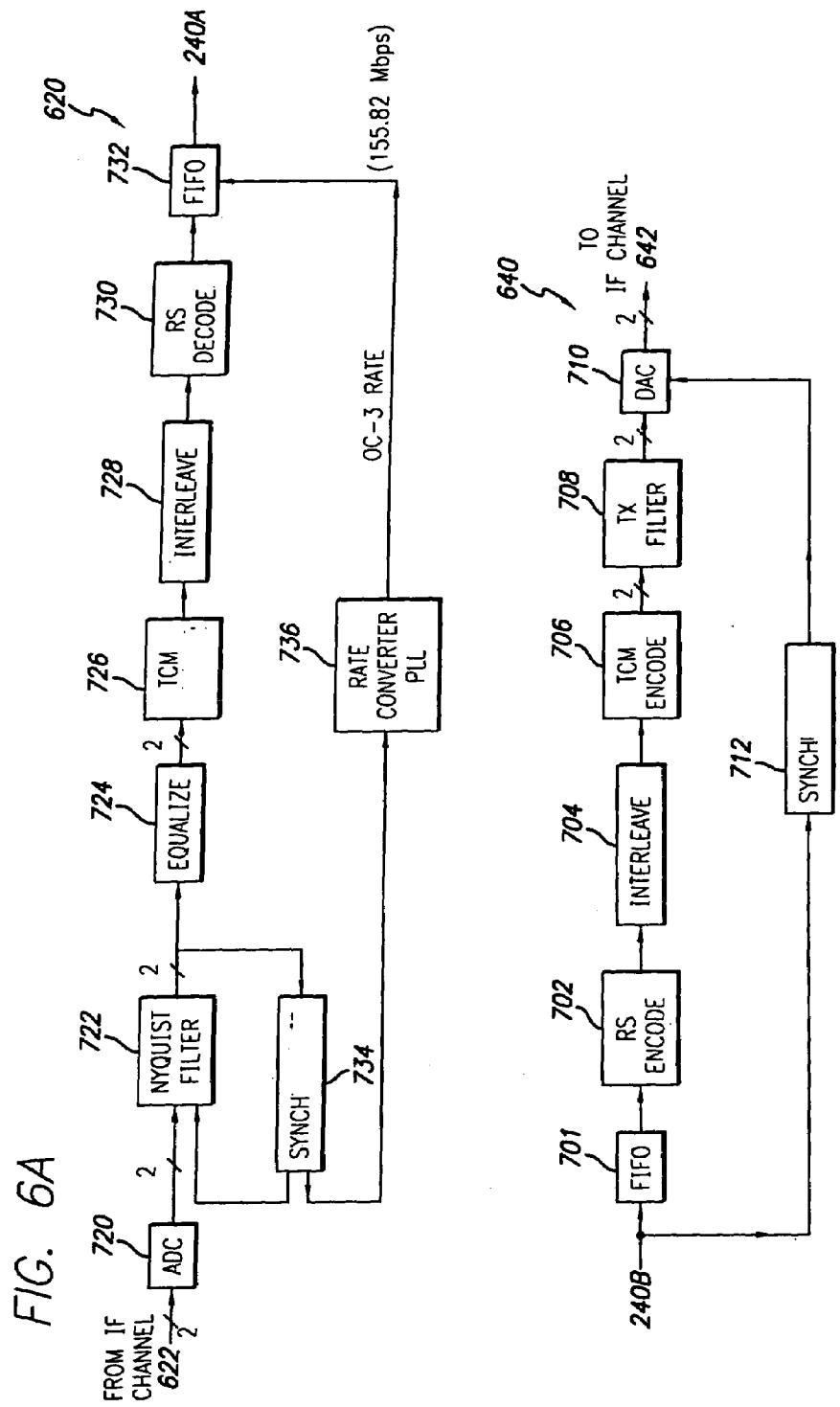

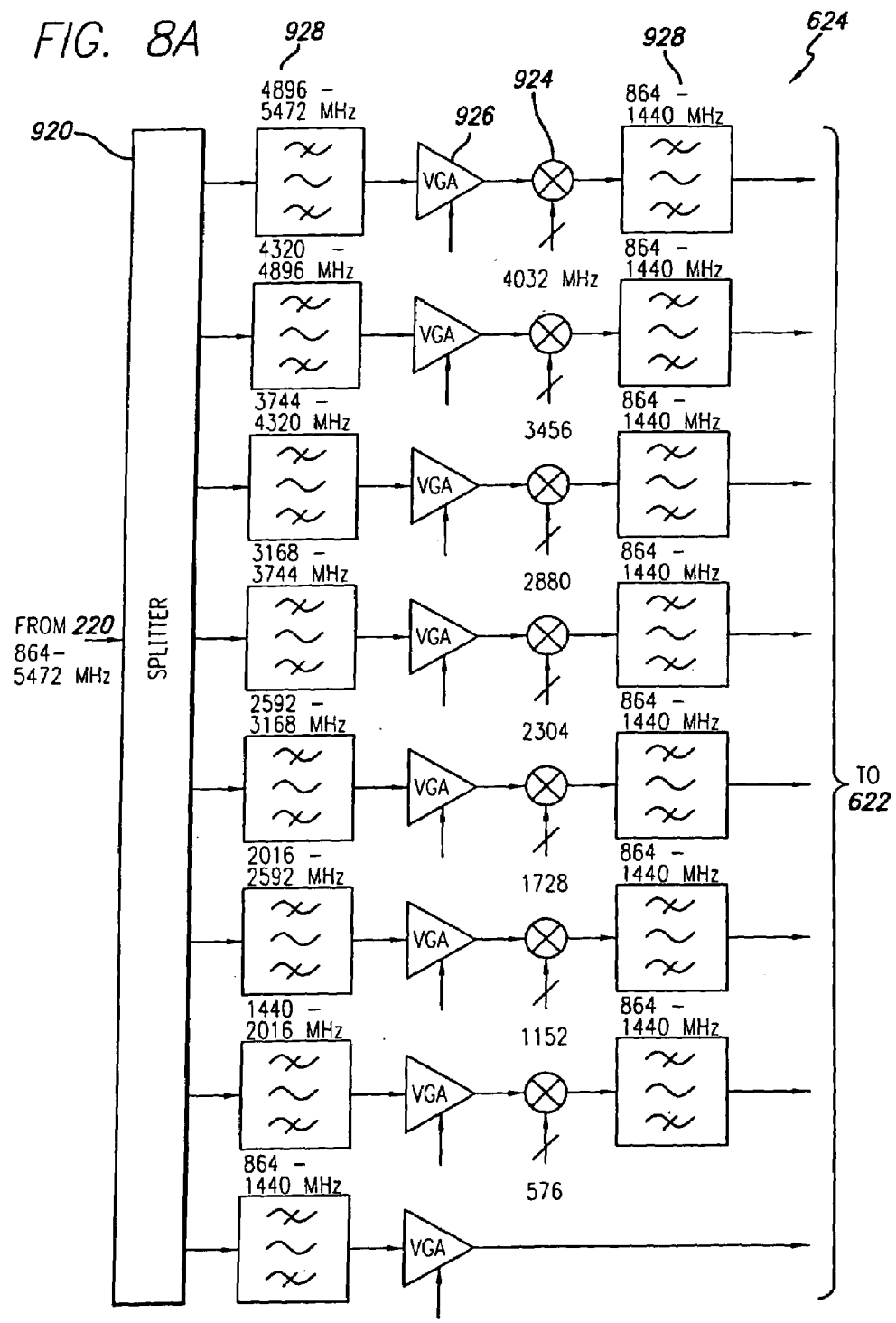

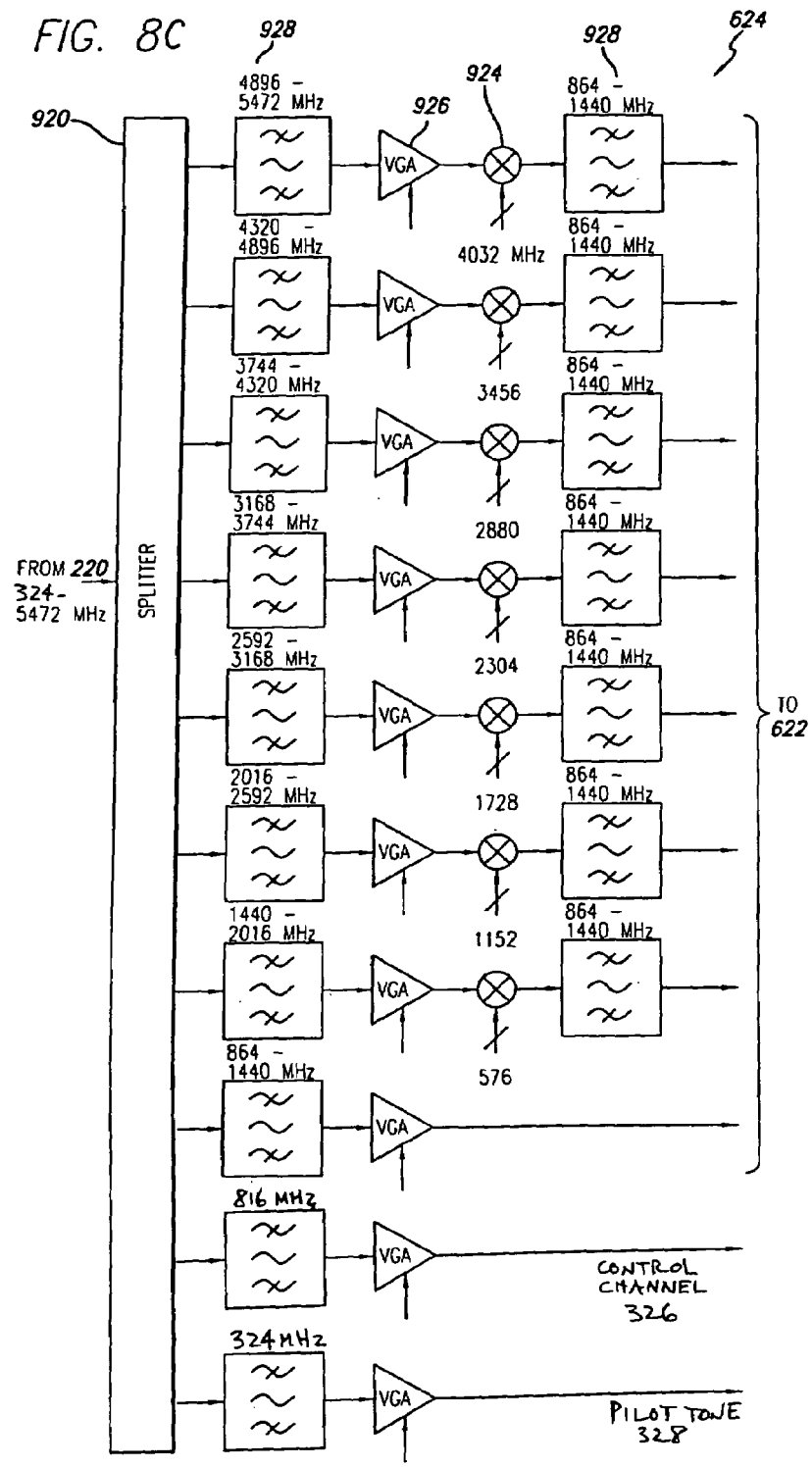

CHANNEL GAIN CONTROL FOR AN OPTICAL COMMUNICATIONS SYSTEM UTILIZING FREQUENCY DIVISION MULTIPLEXING

CROSS-REFERENCE TO RELATED APPLICATIONS

This application is a continuation-in-part of pending U.S. patent application Ser. No. 09/569,761, "Channel Gain Control for an Optical Communications System Utilizing Frequency Division Multiplexing," by Laurence J. Newell and James F. Coward, filed May 12, 2000.

This application is also a continuation-in-part of pending U.S. patent application Ser. No. 09/816,242, "Through-timing of Data Transmitted across an Optical Communications System Utilizing Frequency Division Multiplexing," by David A. Pechner, et al., filed Mar. 23, 2001; which is a continuation-in-part of pending U.S. patent application Ser. No. 09/571,349, "Through-timing of Data Transmitted across an Optical Communications System Utilizing Frequency Division Multiplexing," by David A. Pechner and Laurence J. Newell, filed May 16, 2000.

This application claims the benefit of U.S. Provisional Patent Application Ser. No. 60/273,833, "High-Speed Optical Signal in an Optical Frequency Division Multiplexing System," by Michael W. Rowan, et al., filed Mar. 6, 2001; U.S. Provisional Patent Application Ser. No. 60/211,935, "Method and Apparatus to Mitigate Polarization Mode Dispersion Effects in Optical Communication Networks Utilizing Frequency Division Multiplexing," by Laurence J. Newell, et al., filed Jun. 15, 2000; and U.S. Provisional Patent Application Ser. No. 60/209,020, "Optical Communications Networks Utilizing Frequency Division Multiplexing," by Michael W. Rowan, et al., filed Jun. 1, 2000.

This application is related to U.S. patent application Ser. No. 09/853,556, "Control Channel for an Optical Communications System Utilizing Frequency Division Multiplexing," by Laurence J. Newell and David A. Pechner, filed on even date herewith; and U.S. patent application Ser. No. 09/854,246, "Synchronizing Nodes in an Optical Communications System Utilizing Frequency Division Multiplexing," by Laurence J. Newell, filed on even date herewith.

The subject matter of all of the foregoing is incorporated herein by reference.

BACKGROUND OF THE INVENTION

1. Field of the Invention

This invention relates generally to optical fiber communications, and more particularly, to the use of independent gain control for different frequency channels in an optical fiber communications systems utilizing frequency division multiplexing.

2. Description of the Related Art

As the result of continuous advances in technology, particularly in the area of networking, there is an increasing demand for communications bandwidth. For example, the growth of the Internet, home office usage, e-commerce and other broadband services is creating an ever-increasing demand for communications bandwidth. Upcoming widespread deployment of new bandwidth-intensive services, such as xDSL, will only further intensify this demand. Moreover, as data-intensive applications proliferate and data rates for local area networks increase, businesses will also demand higher speed connectivity to the wide area network (WAN) in order to support virtual private networks and high-speed Internet access. Enterprises that currently access the WAN through T1 circuits will require DS-3, OC-3, or equivalent connections in the near future. As a result, the networking infrastructure will be required to accommodate greatly increased traffic.

Optical fiber is a transmission medium that is well suited to meet this increasing demand. Optical fiber has an inherent bandwidth which is much greater than metal-based conductors, such as twisted pair or coaxial cable. There is a significant installed base of optical fibers and protocols such as the SONET protocol have been developed for the transmission of data over optical fibers. The transmitter converts the data to be communicated into an optical form and transmits the resulting optical signal across the optical fiber to the receiver. The receiver recovers the original data from the received optical signal. Recent advances in transmitter and receiver technology have also resulted in improvements, such as increased bandwidth utilization, lower cost systems, and more reliable service.

However, current optical fiber systems also suffer from drawbacks which limit their performance and/or utility. Many of these drawbacks are frequency dependent. For example, optical fibers typically exhibit dispersion, meaning that signals at different frequencies travel at different speeds along the fiber. More importantly, if a signal is made up of components at different frequencies, the components travel at different speeds along the fiber and will arrive at the receiver at different times and/or with different phase shifts. As a result, the components may not recombine correctly at the receiver, thus distorting or degrading the original signal. In fact, at certain frequencies, the dispersive effect may result in destructive interference at the receiver, thus effectively preventing the transmission of signals at these frequencies. Dispersion effects may be compensated by installing special devices along the fiber specifically for this purpose. However, the additional equipment results in additional cost and different compensators will be required for different types and lengths of fiber.

As another example, the electronics in an optical fiber system typically will have a transfer function which is not flat. That is, the electronics will exhibit different gain at different frequencies. In other applications, an electronic equalizer may be used to compensate for these frequency-dependent gain variations in the electronics. However, in an optical fiber system, the electronics produce an electrical signal which eventually is converted to/from an optical form. In order to take advantage of the wide bandwidth of optical fibers, the electrical signal produced by the electronics preferably will have a bandwidth matched to the wide bandwidth of the optical fiber. Hence, any electronic equalizer will also have to operate over a wide bandwidth, which makes equalization difficult and largely impractical.

Furthermore, as optical fiber systems become larger and more complex, there is an increasing need for efficient approaches to manage and control these systems. In a common architecture for optical fiber systems, the system includes a set of interconnected nodes, with data being transmitted from node to node. In these systems, there is commonly also a need for control, administrative or overhead information to be transmitted throughout the system or between nodes. Information describing the overall network configuration, software updates, diagnostic information (including both point to point diagnostics as well as system-wide diagnostics), timing data (such as might be required to implement a global clock if so desired) and performance metrics are just a few examples of these types of information.

Thus, there is a need for optical communications systems which reduce or eliminate the deleterious effects caused by frequency-dependent effects, such as fiber dispersion and the nonflat transfer function of electronics in the system. There is further a need for systems which support the efficient transmission of control and overhead information.

SUMMARY OF THE INVENTION

In accordance with the present invention, a method for compensating for dispersion effects in an optical fiber includes the following steps. Examples of dispersion effects are those which result from chromatic dispersion and/or polarization mode dispersion and/or polarization mode dispersion. Two or more low-speed channels are received. Each low-speed channel is allocated a different frequency band for transmission across a communications system which includes the optical fiber. For each low-speed channel, the attenuation caused by dispersion resulting from transmission of the low-speed channel across the optical fiber in the frequency band allocated to the low-speed channel is estimated. The power of each low-speed channel is adjusted to compensate for the estimated attenuation. The power-adjusted low-speed channels are frequency division multiplexed together to produce an electrical high-speed channel for transmission across the communications system. In one embodiment, gain which is equal in magnitude to the estimated attenuation is applied to each low-speed channel.

In another aspect of the invention, an optical fiber communications system includes a variable gain block coupled to a FDM multiplexer. The variable gain block adjusts the power of each low-speed channel, as described above. The FDM multiplexer combines the power-adjusted low-speed channels into the electrical high-speed channel suitable for transmission across the communications system.

The present invention is particularly advantageous because dispersion effects, such as chromatic dispersion and/or polarization mode dispersion, may be compensated in an optical fiber communications system. This, in turn, enhances the performance of the overall system.

BRIEF DESCRIPTION OF THE DRAWING

The invention has other advantages and features which will be more readily apparent from the following detailed description of the invention and the appended claims, when taken in conjunction with the accompanying drawing, in which:

FIG. 4A is a block diagram of a preferred embodiment of FDM demultiplexer 225;

FIG. 4B is a block diagram of a preferred embodiment of FDM multiplexer 245;

FIG. 5A is a block diagram of a preferred embodiment of low-speed output converter 270;

FIG. 5B is a block diagram of a preferred embodiment of low-speed input converter 275;

FIG. 6A is a block diagram of a preferred embodiment of demodulator 620;

FIG. 6B is a block diagram of a preferred embodiment of modulator 640;

FIG. 8A is a block diagram of a preferred embodiment of RF down-converter 624;

FIG. 8C is a block diagram of another preferred embodiment of RF down-converter 624.

DETAILED DESCRIPTION OF THE PREFERRED EMBODIMENTS

Figure 1A:
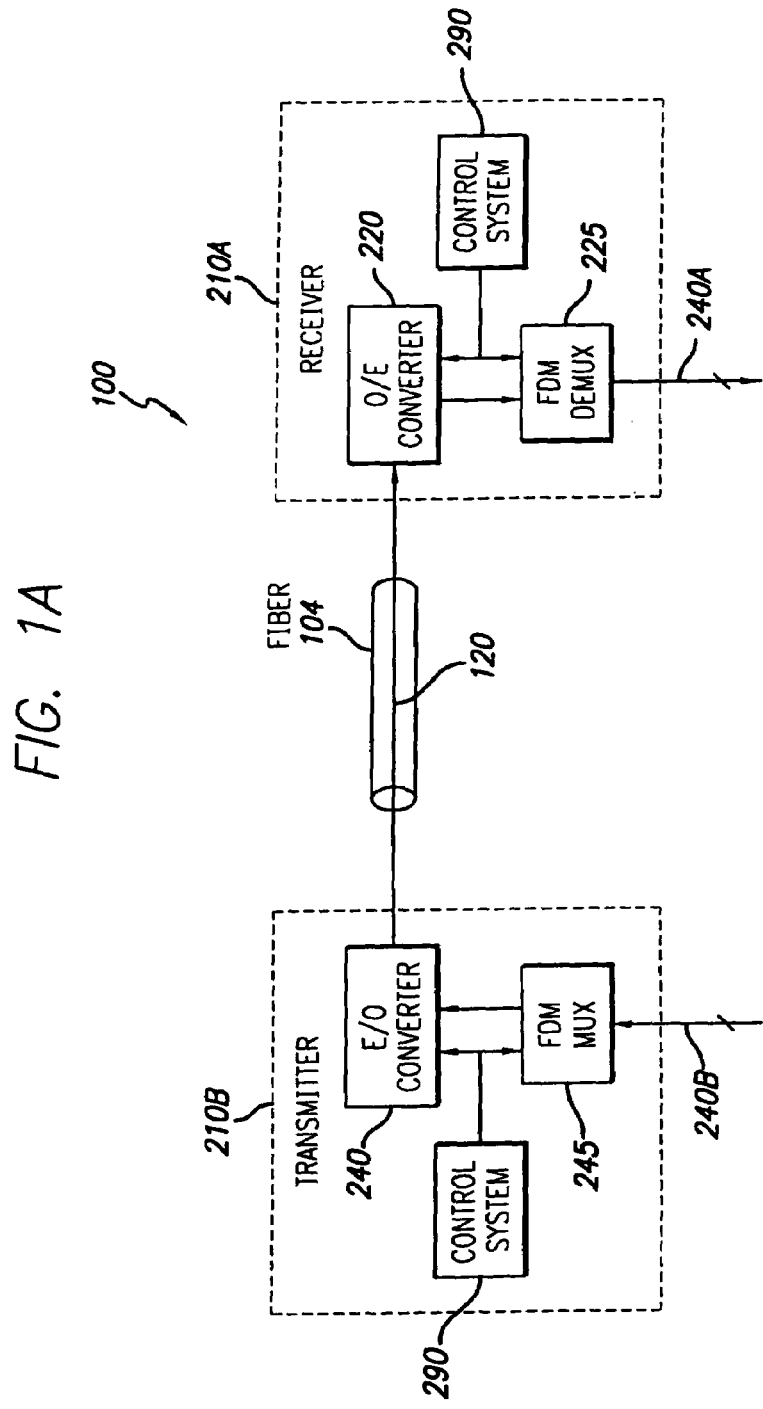
FIG. 1A is a block diagram of a fiber optic communications system 100 in accordance with the present invention.

FIG. 1A is a block diagram of a fiber optic communications system 100 in accordance with the present invention. System 100 includes a transmitter 210B coupled to a receiver 210A by an optical fiber 104. Transmitter 210B and receiver 210A are both based on frequency division multiplexing (FDM). Transmitter 210B includes an FDM multiplexer 245 coupled to an E/O converter 240. The FDM multiplexer 245 combines a plurality of incoming signals 240B into a single signal using FDM techniques, and E/O converter 240 converts this single signal from electrical to optical form 120. The E/O converter 240 preferably includes an optical source, such as a laser, and an optical modulator, such as a Mach Zender modulator, which modulates the optical carrier produced by the optical source with an incoming electrical signal. For convenience, the incoming signals 240B shall be referred to as low-speed channels; the single signal formed by FDM multiplexer 245 as an electrical high-speed channel, and the final optical output 120 as an optical high-speed channel.

Receiver 210A reverses the function performed by transmitter 210B, reconstructing the original channels 240B at the receiver location. More specifically, receiver 120 includes an O/E converter 220 coupled to an FDM demultiplexer 225. The O/E converter 220, preferably a detector such as a high-speed PIN diode, converts the incoming optical high-speed channel 120 from optical to electrical form. The frequency division demultiplexer 225 frequency division demultiplexes the electrical high-speed channel into a plurality of low-speed channels 240A.

The various components in transmitter 210B and receiver 210A are controlled by their respective control systems 290. The control systems 290 preferably also have an external port to allow external control of the transmitter 210B and receiver 210A. For example, an external network management system may manage a large fiber network, including a number of transmitters 210B and receivers 210A. Alternately, a technician may connect a craft terminal to the external port to allow local control of transmitter 210B or receiver 210A, as may be desirable during troubleshooting.

Figure 1B:
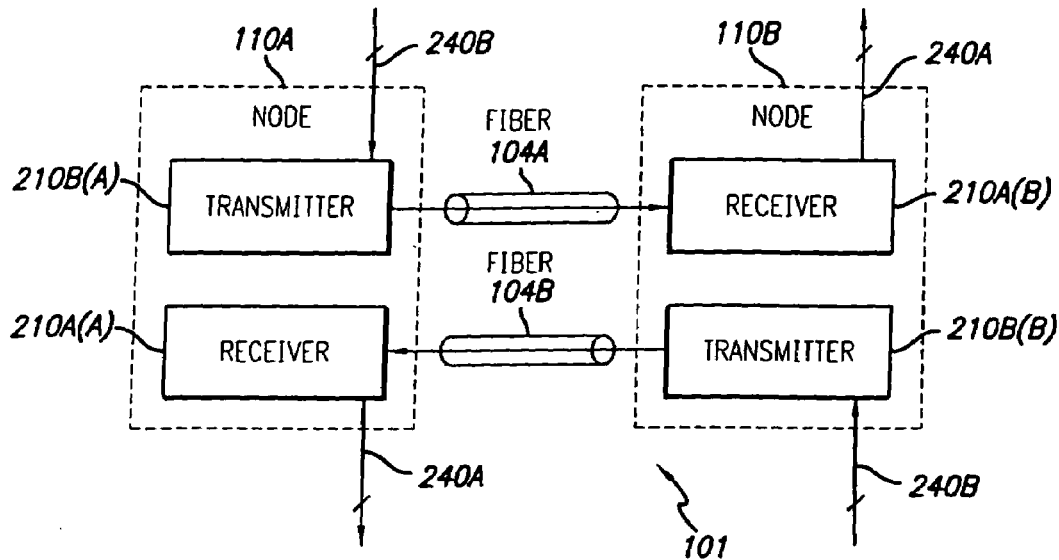
FIG. 1B is a block diagram of another fiber optic communications system 101 in accordance with the present invention.

Various aspects of the invention will be illustrated using the example system 100. However, the invention is not limited to this particular system 100. For example, FIG. 1B is a block diagram of another fiber optic communications system 101 also in accordance with the present invention. System 101 includes two nodes 110A and 110B, each of which includes a transmitter 210B and receiver 210A. The two nodes 110 are coupled to each other by two fibers 104A and 104B, each of which carries traffic from one node 110 to the other 110. Fiber 104A carries traffic from transmitter 210B(A) to receiver 210A(B); whereas fiber 104B carries traffic from transmitter 210B(B) to receiver 210A(A). In a preferred embodiment, the fibers 104 also carry control or other overhead signals between the nodes 110. In an alternate embodiment, the nodes 110 may be connected by a single fiber 104 which carries bidirectional traffic. In other embodiments, the nodes 110 may contain additional functionality, such as add-drop functionality, thus allowing the nodes 110 to from more complex network configurations.

Figure 2:
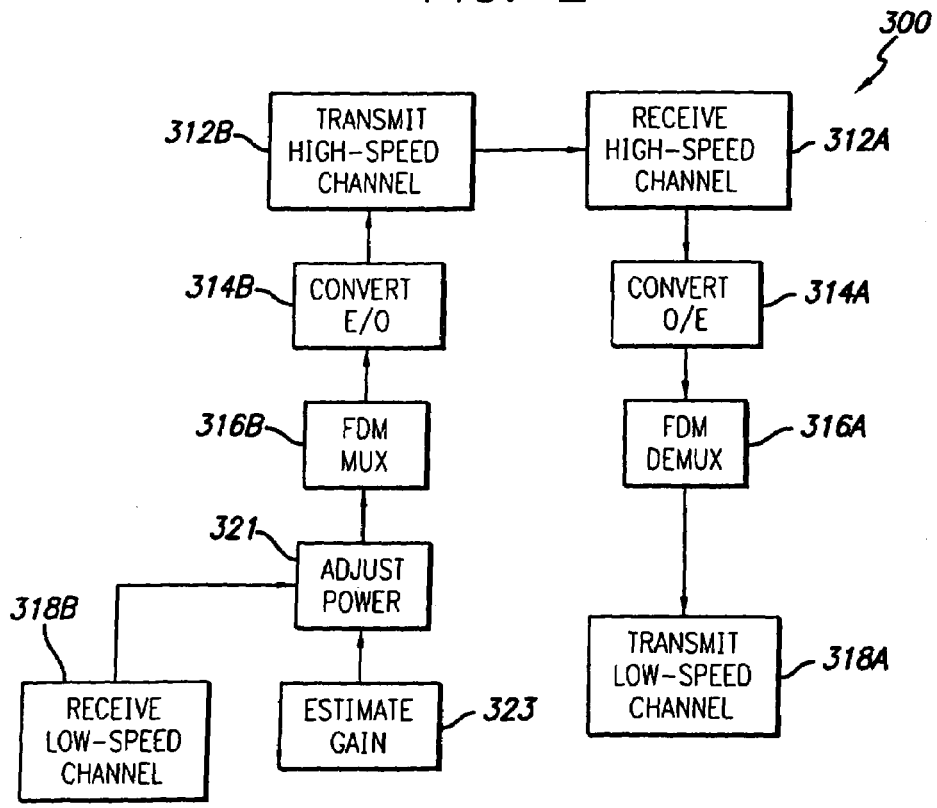
FIG. 2 is a flow diagram illustrating operation of system 100.

FIG. 2 is a flow diagram illustrating operation of system 100. At a high level, transmitter 210B combines low-speed channels 240B into an optical high-speed channel 120 using FDM techniques (steps 318B, 316B and 314B). As part of this process, the power of each low-speed channel 240B is adjusted to compensate for estimated gain effects which the low-speed channel 240B will experience while propagating through system 100 (steps 321 and 323). The gain-compensated high-speed channel 120 is then transmitted across fiber 104 (steps 312). Receiver 210A then demultiplexes the received optical high-speed channel 120 into its constituent low-speed channels 240A (steps 314A, 316A and 318A).

In more detail, low-speed channels 240B are received 318B by transmitter 210B. The FDM multiplexer 245 combines these channels into a high-speed channel using frequency division multiplexing 316B techniques. Typically, each low-speed channel 240B is modulated on a carrier frequency distinct from all other carrier frequencies and these modulated carriers are then combined to form a single electrical high-speed channel, typically an RF signal. E/O converter 240 converts 314B the electrical high-speed channel to optical form, preferably via an optical modulator which modulates an optical carrier with the electrical high-speed channel. The optical high-speed channel 120 is transmitted 312B across fiber 104 to receiver 210A.

Figure 3A:
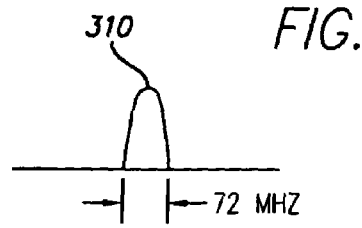
FIG. 3A-3D are frequency diagrams illustrating operation of system 100.
Figure 3B:
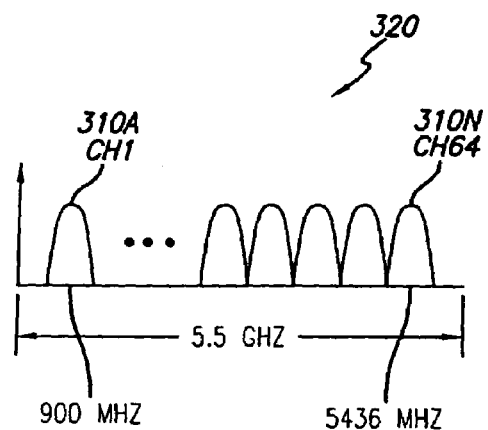
Figure 3C:
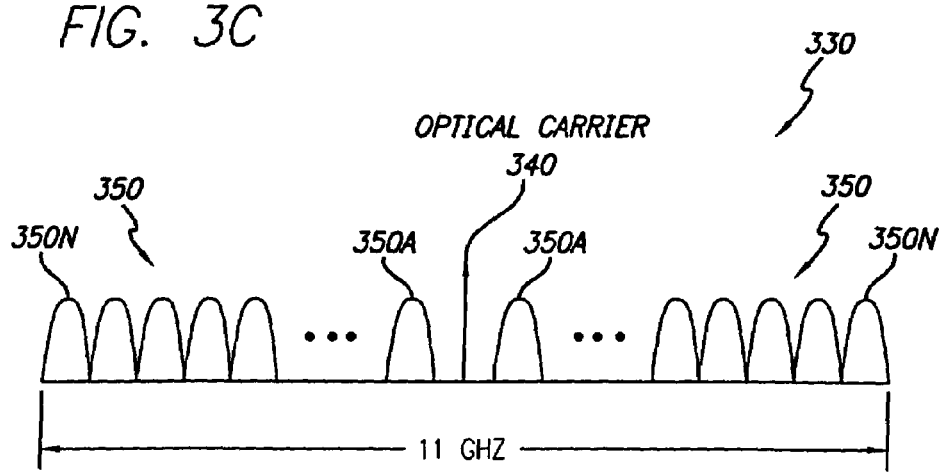

FIGS. 3A-3C are frequency diagrams illustrating the mapping of low-speed channels 240B to optical high-speed channel 120 in system 100. These diagrams are based on an example in which high-speed channel 120 carries 10 billion bits per second (Gbps), which is equivalent in data capacity to an OC-192 data stream. Each low-speed channel 240 is an electrical signal which has a data rate of 155 million bits per second (Mbps) and is similar to an STS-3 signal. This allows 64 low-speed channels 240 to be included in each high-speed channel 120. The invention, however, is not to be limited by this example.

FIG. 3A depicts the frequency spectrum 310 of one low-speed channel 240B after pre-processing. As mentioned previously, each low-speed channel 240B has a data rate of 155 Mbps. In this example, the low-speed channel 240B has been pre-processed to produce a spectrally efficient waveform (i.e., a narrow spectrum), as will be described below. The resulting spectrum 310 has a width of approximately 72 MHz with low sidelobes. FIG. 3B is the frequency spectrum 320 of the electrical high-speed channel produced by FDM multiplexer 245. Each of the 64 low-speed channels 240B is allocated a different frequency band and then frequency-shifted to that band. The signals are combined, resulting in the 64-lobed waveform 320. FIG. 3C illustrates the spectra 330 of the optical high-speed channel 120. The RF waveform 320 of FIG. 3B is intensity modulated. The result is a double sideband signal with a central optical carrier 340. Each sideband 350 has the same width as the RF waveform 320, resulting in a total bandwidth of approximately 11 GHz.

Receiver 210A reverses the functionality of transmitter 210B. The optical high-speed channel 120 is received 312A by the high-speed receiver 210A. O/E converter 220 converts 314A the optical high-speed channel 120A to an electrical high-speed channel, typically an RF signal. This electrical high-speed channel includes a number of low-speed channels which were combined by frequency division multiplexing. FDM demultiplexer 225 frequency division demultiplexes 316A the high-speed signal to recover the low-speed channels 240A, which are then transmitted 318A to other destinations. The frequency spectrum of signals as they propagate through receiver 210A generally is the reverse of that shown in FIG. 3.

Note that each low-speed channel 240 has been allocated a different frequency band for transmission from transmitter 210B to receiver 210A. For example, referring again to FIG. 3, the low frequency channel 310A may enter transmitter 210B at or near baseband. FDM multiplexer 245 upshifts this channel 310A to a frequency of approximately 900 MHz. E/O converter 240 then intensity modulates this channel, resulting in two sidelobes 350A which are 900 MHz displaced from the optical carrier 340. Low-speed channel 310A propagates across fiber 104 at these particular frequencies and is then downshifted accordingly by receiver 210A. In contrast, the high frequency channel 310N is upshifted by FDM multiplexer 245 to a frequency of approximately 5436 MHz and sidelobes 350N are correspondingly displaced with respect to optical carrier 340.

Figure 3D:
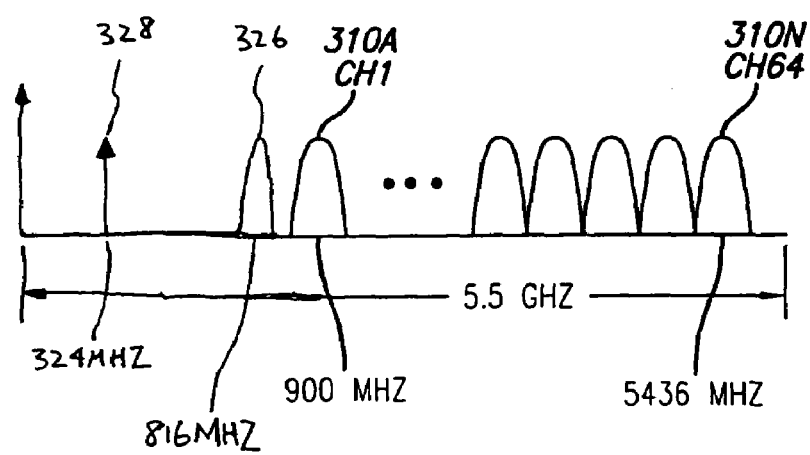

In a preferred embodiment, the optical signal carries signals in addition to the sidelobes 350 carrying the low-speed channels 330. FIG. 3D is the frequency spectrum of an electrical high-speed channel which also includes a pilot tone 328 and a frequency band 326 used for control or other overhead information. For convenience, frequency band 326 shall be referred to as a control channel, although it may carry overhead information other than control signals or be used for purposes other than control.

In general, the control channel 326 provides a communications link between the nodes along the same media (i.e., fiber 104) used by the data-carrying sidelobes 350. The control channel 326 has many uses. For example, the control channel may be used for remote monitoring; performance metrics measured at one node may be communicated to another node or to a central location via the control channel. The control channel may also be used to send commands to each node, for example to set or alter the configuration of a node. When a node first comes onto a network or returns to the network after a fault, the control channel may be used to implement part of the procedure for bringing the node onto the network. For example, the control channel may be established before the data-carrying channels and may then be used to help set up the data-carrying channels. Alternately, the control channel may also be used to establish handshaking between nodes. As a final example, in fault situations, the control channel may be used to gather diagnostic information for fault isolation and also to aid in fault recovery.

The pilot tone 328 is used to synchronize local oscillators used in the transmitter 210B and receiver 210A. The transmitter 210B generates a reference signal at a frequency of 36 MHz and RF electronics at transmitter 210B are locked to this reference signal. Electronics also generate the pilot tone 328 from the reference signal. In this particular case, the pilot tone 328 is at a frequency of 324 MHz, or the ninth harmonic of the base frequency of 36 MHz. Conventional intensity modulation results in double sideband modulation. The ninth harmonic is used in order to provide adequate separation between the pilot tones 328 and the optical carrier in the final optical signal. At the receiver 210A, the pilot tone 328 is recovered and frequency divided by nine to recover the original 36 MHz reference signal. Local oscillators at receiver 210A are locked to the recovered reference signal and local oscillators at transmitter 210B are locked to the original reference signal. Thus, local oscillators at the receiver 210A and the transmitter 210B are locked to each other.

In this embodiment, the control channel 326 has a width of 26 MHz and a center frequency of 816 MHz. The control channel 326 is described in more detail below. In this embodiment, both the control channel 326 and the pilot tone 328 are located at frequencies lower than the data-carrying sidelobes 310. However, this is not required. Alternate embodiments can locate the control channel(s) and pilot tone(s) at different frequencies, including interspersed among the sidelobes 310 and/or at frequencies higher than the sidelobes 310.

Since each low-speed channel 240 is allocated a different frequency band, each channel will typically experience a different gain as it propagates through system 100. For example, fiber losses, such as due to chromatic dispersion or polarization mode dispersion, typically will be different for sidelobes 350A and 350N since they are located at different frequencies. Similarly, the gain due to propagation through the various electronic components may also differ since electronics may exhibit different responses at different frequencies. The term "gain" is used here to refer to both losses and amplification.

However, since the frequency band of each low-speed channel 240 is known, the gain which the low-speed channel 240 will experience as it propagates through system 100 may be estimated 323 and then compensated for 321 by adjusting the power of each low-speed channel. For example, if sidelobe 350N is expected to experience more loss than sidelobe 350A due to chromatic dispersion, then sidelobe 350N may be amplified with respect to sidelobe 350A in order to compensate for the expected higher loss. The amplification may be applied directly to sidelobe 350N or at other locations within system 100, for example to lobe 310N exiting the FDM multiplexer 245 or to the corresponding low-speed channel 240B as it enters the system 100.

The gain may be estimated in any number of ways. For example, with respect to fiber 104, in one embodiment, standard analytical models are used to estimate the gain due to propagation through fiber 104 at different frequencies due to different physical phenomena. Often, these gain estimates will depend on the length of fiber 104, which itself may be estimated based on the expected application. Alternately, the length may be measured, for example by using time-domain reflectometry. In a preferred embodiment, a test signal is sent from node 110A over fiber 104A to node 110B. Node 110B receives the signal and then returns it to node 110A via fiber 104B A timer circuit measures the round-trip elapsed time, which is used to estimate the fiber length.

Similarly, the gain estimates for fiber 104 may alternately be determined empirically by measuring the actual gain experienced at different frequencies or by using empirical models. Analogous techniques may be applied to the rest of system 100. For example, the gain of electronics may be estimated based on models or may be measured by calibrations, for example performed by the manufacturer at the time of production.

Figure 9A:
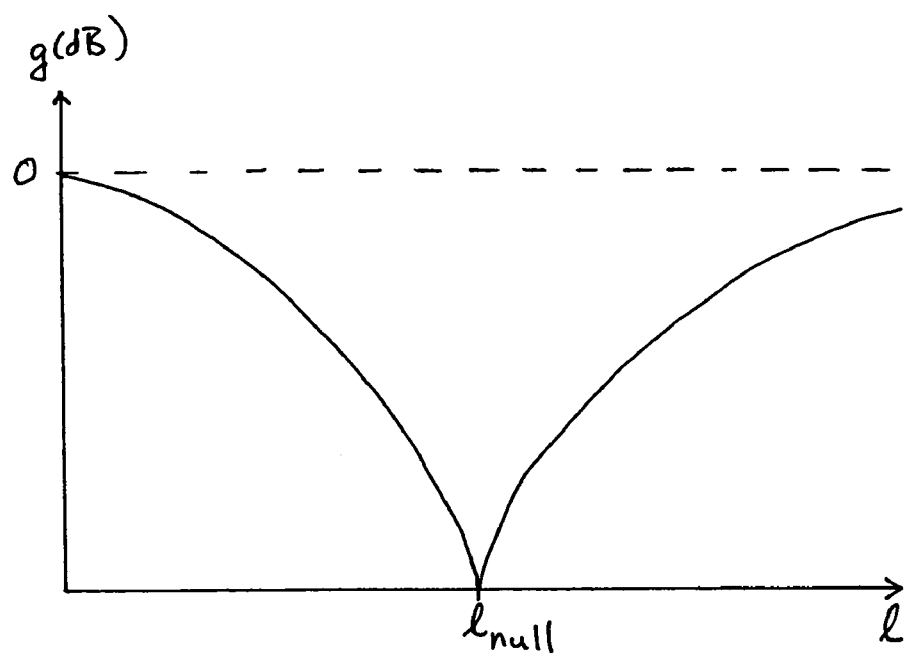
FIG. 9A-9C are graphs of gain profiles resulting from attenuation due to impairments in a fiber.
Figure 9B:
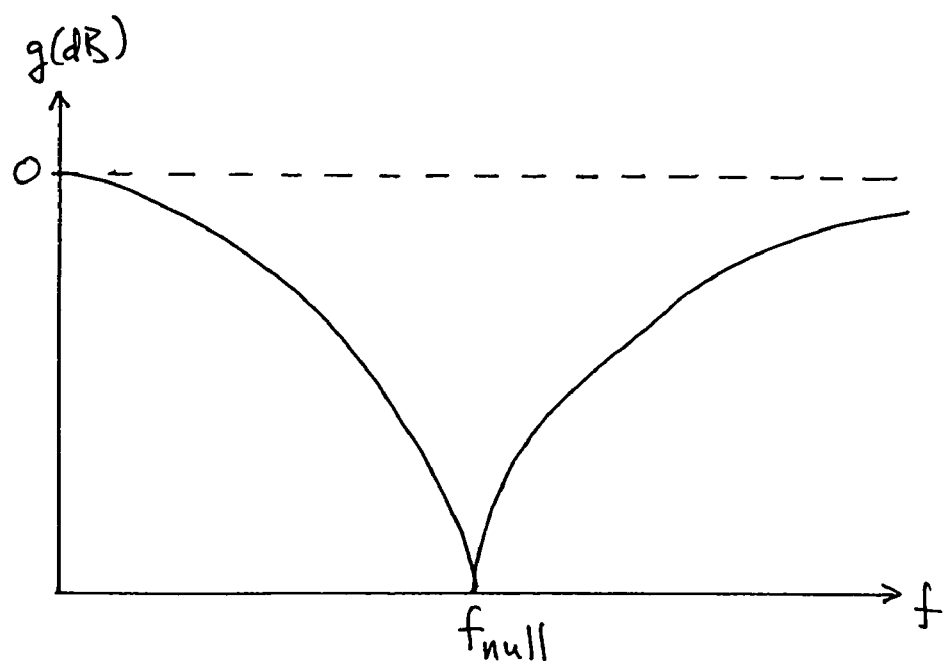
Figure 9C:
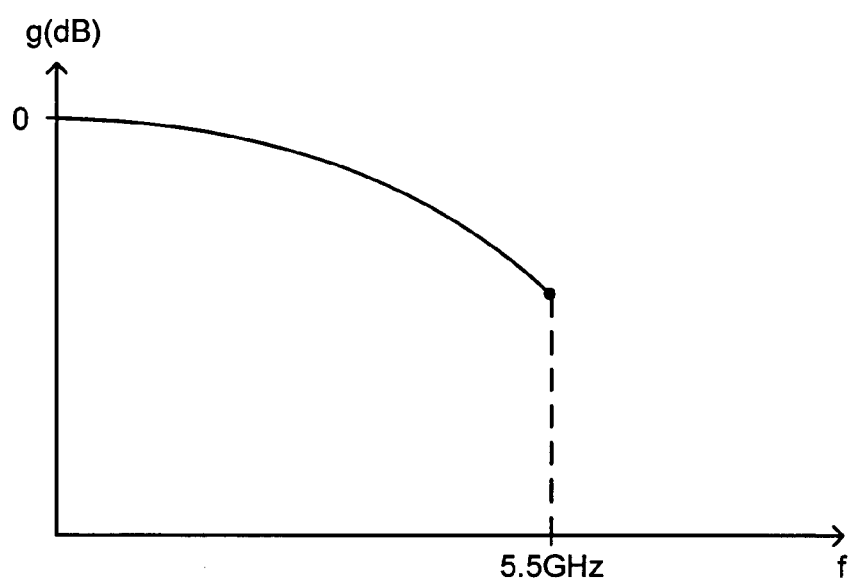

FIGS. 9A-9C are graphs illustrating the attenuation resulting from chromatic dispersion. These graphs plot gain, so increased attenuation is shown as low values of gain. Generally speaking, in optical systems using double-sideband optical signals, the attenuation of the detected signal which results from chromatic dispersion is a function of the length of the fiber, denoted by l, and the frequency of the sidelobe 350 of interest, denoted by f. As shown in FIG. 9A, for a given frequency f, chromatic dispersion results in an increasing attenuation with increasing length l, until a null is reached. After a null is reached, the attenuation decreases. Similarly, as shown in FIG. 9B, for a given length of fiber l, the attenuation due to chromatic dispersion increases with increasing frequency f, until a null is reached. Then, the attenuation decreases. If the fiber length l and frequencies f of the sidelobes 350 are selected so that a null is not reached, then the chromatic dispersion typically results in a gain rolloff with frequency in the detected signal, as shown in FIG. 9C. Polarization mode dispersion generally has a similar behavior.

Figure 9D:
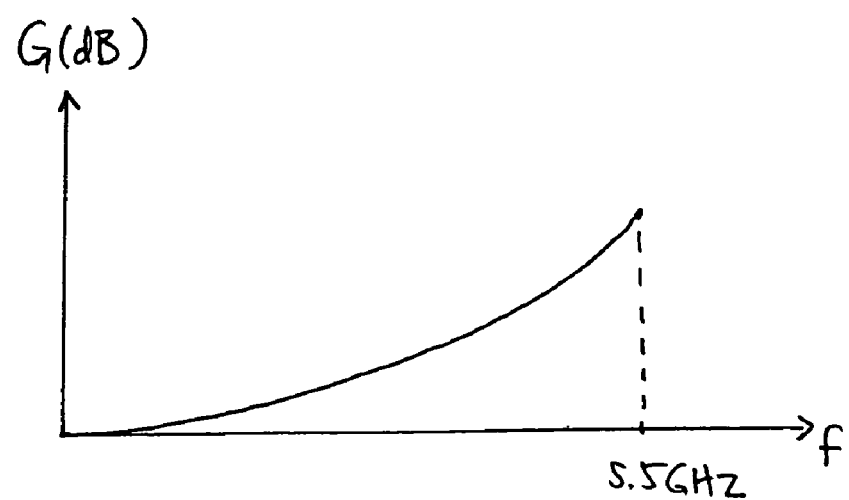
FIG. 9D is a graph illustrating a gain ramp applied to a transmitted signal.

Thus, if all of the sidelobes 350 were of equal power when they entered a fiber 104 with the gain profile shown in FIG. 9C, the higher frequency sidelobes typically would experience more attenuation in the detected signal as the optical signal propagates through the fiber. This would result in a rolloff in power received at the receiver 210A at the higher frequencies. Since it is desirable for power for all sidelobes 350 to be roughly equal at the receiver 210A, it is desirable to compensate for this rolloff effect. Accordingly, at the transmitter 210B, the power of the higher frequency low-speed channels 240 is boosted 321 with respect to the lower frequency channels 240 so that after propagation through fiber 104, the sidelobes 350 are of roughly equal power when they reach the receiver 210A. FIG. 9D is a graph of the gain G applied to compensate for the rolloff. As the inverse of gain g in FIG. 9C (i.e., G=1/g), the gain G in FIG. 9D increases with increasing frequency and is concave up. This gain profile is also known as a gain ramp. The gain G is shown as a continuous curve. However, in a preferred embodiment, a constant gain is applied across each sidelobe 350. For example, the gain G at the center frequency of a specific sidelobe 350 may be applied to the entire sidelobe.

When more than one effect is present, the gain G preferably compensates for all significant effects. For example, in some situations, both chromatic dispersion and polarization mode dispersion result in substantial attenuation of the signal. In one embodiment, the compensatory gain function G(f) is determined according to G(f)=$G_{CD}$(f) $G_{PMD}$(f), where $G_{CD}$(f) compensates for attenuation due to chromatic dispersion and $G_{PMD}$(f) compensates for attenuation due to polarization mode dispersion. In one embodiment, the function $G_{PMD}$(f) is selected to accommodate for the peak instantaneous differential group delay intended to be tolerated. In a preferred embodiment, the gain $G_{PMD}$(f) compensates for a peak differential group delay of 46 ps and results in a 3 dB gain applied to low-speed channel number 64, centered at frequency f=5436 MHz. This 3 dB gain offsets the differential group delay of 46 ps and ensures that data channel 64 arrives with the same power as a data channel propagating without substantial PMD and therefore without a gain ramp. Continuing this example, an instantaneous differential group delay of 70 ps due to polarization mode dispersion results in an optical power penalty of 3 dB.

Other compensatory gain functions G will be apparent For example, the external optical modulator in E/O converter 240 may result in a rolloff with frequency. The gain G can be used to compensate for this rolloff, for example by using a power amplifier to apply gain to the RF signal entering the modulator.

The gain may also be estimated using closed loop techniques. In other words, the low-speed channel 240 is transmitted across system 100 and a feedback signal is produced responsive to this transmission. The power of the low-speed channel is then adjusted 321 responsive to the feedback signal. As examples, in one embodiment, the feedback signal may depend on the power of the low-speed channel after it has been transmitted across system 100. In another embodiment, it may depend on the signal to noise ratio or various error rates in the received low-speed channel 240A.

In a preferred embodiment, the feedback signal is generated by monitor circuitry coupled to the FDM demultiplexer 225 and fed back from receiver 210A to transmitter 210B via fiber 104, as opposed to some other communications channel. In system 101 of FIG. 1B, the control systems 290 may communicate with each other via the bidirectional traffic on these fibers 104. For example, consider traffic flow from transmitter 210B(A) across fiber 104A to receiver 210A(B). The feedback signal generated at receiver 210A(B) for this traffic is fed back to transmitter 210B(A) via the other fiber 104B. The control system 290 for node 110A then generates the appropriate control signals to adjust the powers of the low-speed channels. Similarly, the feedback signal for traffic flowing from transmitter 210B(B) across fiber 104B to receiver 210A(A) may be fed back to transmitter 210B(B) via the other fiber 104A.

In a preferred embodiment, a frequency band located between the sidebands 350 (see FIG. 3C) and the optical carrier 340 is allocated for control and/or administrative purposes (e.g., for downloading software updates). In a preferred embodiment, this control channel is also used to transmit the feedback signal between the nodes 110 and for time domain reflectometry in order to estimate the length of the fiber. Since it is often desirable to establish initial communications between nodes 110 using the control channel before establishing the actual data links using sidebands 350, the control channel preferably has a lower data rate and is less susceptible to transmission impairments than the data carrying sidebands 350. In an alternate embodiment, one of the frequency bands within the electrical high-speed channel 320 is used for the feedback signal.

Referring now to FIG. 3D, in one embodiment, the control channel 326 has a spectral bandwidth of 26 MHz and utilizes alternate mark inversion/frequency-shift keying (AMI/FSK) modulation with a peak frequency deviation of 9 MHz. Data is transmitted at a rate of 2.048 Mbps using the E1 protocol. Because the control channel 326 transmits at the E1 data rate, which is lower than the transmission rate of the data-carrying sidebands 310, control channel 326 is more robust than the data channels 310 and can tolerate lower SNR. Furthermore, because of the lower data rate and because, in the optical signal, the control channel 326 is closer to the optical carrier than the data-carrying channels 350, the control channel 326 is generally more resistant to fiber impairments than the data channels 350. Thus, in situations when the data channels 350 are not transmitting properly, the control channel may still be functioning normally. The control channel 326 can then be used by control system 290 to communicate between nodes 110A and 110B in order to bring the data channels 350 to normal operation. This situation may occur if there is a fault in the system or upon start up of the system. The control channel 326 can also be used to exchange information during routine operation, as described above.

Any number of techniques may be used to adjust 321 the power of the low-speed channels 240. For example, if a closed loop technique is used, standard control algorithms such as proportional control may be used. In another approach, a common mode and a differential mode adjustment may be used alternately. In the differential mode adjustment, the total power of all low-speed channels is kept constant while the allocation of power among the various channels is adjusted. Thus, for example, the gain applied to sidelobe 350A may be increased by a certain amount if the gain applied to sidelobe 350N is reduced by the same amount, so that the total power in all sidelobes 350 remains constant. In the common mode adjustment, the allocation of power among the various low-speed channels 240 remains constant while the total power is adjusted. Thus, for example, the gain applied to sidelobes 350A, 350N and all other sidelobes 350 may be increased by the same amount, thus increasing the total power.

The use of frequency division multiplexing in system 100 allows the transport of a large number of low-speed channels 240 over a single fiber 104 in a spectrally-efficient manner. It also reduces the cost of system 100 since the bulk of the processing performed by system 100 is performed on low-speed electrical signals. In addition, since each low-speed channel is allocated a specific frequency band, the use of frequency division multiplexing allows different gain to be applied to each low-speed channel in an efficient manner, thus compensating for the specific gain to be experienced by the low-speed channel as it propagates through system 100.

FIGS. 4-8 are more detailed block diagrams illustrating various portions of a preferred embodiment of system 100. Each of these figures includes a part A and a part B, which correspond to the receiver 210A and transmitter 210B, respectively. These figures will be explained by working along the transmitter 210B from the incoming low-speed channels 240B to the outgoing high-speed channel 120, first describing the component in the transmitter 120B (i.e., part B of each figure) and then describing the corresponding components in the 120A (i.e., part A of each figure). These figures are based on the same example as FIG. 3, namely 64 STS-3 data rate low-speed channels 240 are multiplexed into a single optical high-speed channel 120. However, the invention is not to be limited by this example or to the specific structures disclosed.

FIG. 4B is a block diagram of a preferred embodiment of transmitter 210B. In addition to FDM multiplexer 245 and E/O converter 240, this transmitter 210B also includes a low-speed input converter 275 coupled to the FDM multiplexer 245. FDM multiplexer 245 includes a modulator 640, IF up-converter 642, and RF up-converter 644 coupled in series. FIGS. 6B-8B show further details of each of these respective components. Similarly, FIG. 4A is a block diagram of a preferred embodiment of receiver 210A. In addition to O/E converter 220 and FDM demultiplexer 225, this receiver 210A also includes a low-speed output converter 270 coupled to the FDM demultiplexer 225. FDM demultiplexer 225 includes an RF down-converter 624, IF down-converter 622, and demodulator 620 coupled in series, with FIGS. 6A-8A showing the corresponding details.

FIGS. 5A-5B are block diagrams of one type of low-speed converter 270, 275. In the transmit direction, low-speed input converter 275 converts tributaries 160B to low-speed channels 240B, which have the same data rate as STS-3 signals in this embodiment. The structure of converter 275 depends on the format of the incoming tributary 160B. For example, if tributary 160B is an STS-3 signal then no conversion is required. If it is an OC-3 signal, then converter 275 will perform an optical to electrical conversion.

FIG. 5B is a converter 275 for an OC-12 tributary. Converter 275 includes an O/E converter 510, CDR 512, TDM demultiplexer 514, and parallel to serial converter 516 coupled in series. The O/E converter 510 converts the incoming OC-12 tributary 160B from optical to electrical form, producing the corresponding STS-12 signal. CDR 512 performs clock and data recovery of the STS-12 signal and also determines framing for the signal. CDR 512 also converts the incoming bit stream into a byte stream. The output of CDR 512 is byte-wide, as indicated by the "×8." Demultiplexer 514 receives the signal from CDR 512 one byte at a time and byte demultiplexes the recovered STS-12 signal using time division demultiplexing (TDM) techniques. The result is four separate byte-wide signals, as indicated by the "4×8," each of which is equivalent in data rate to an STS-3 signal and with the corresponding framing. Converter 516 also converts each byte-wide signal into a serial signal at eight times the data rate, with the resulting output being four low-speed channels 240B, each at a data rate of 155 Mbps.

Low-speed input converter 270 of FIG. 5A implements the reverse functionality of converter 275, converting four 155 Mbps low-speed channels 240A into a single outgoing OC-12 tributary 160A. In particular, converter 270 includes CDR 528, FIFO 526, TDM multiplexer 524, parallel to serial converter 522, and E/O converter 520 coupled in series. CDR 528 performs clock and data recovery of each of the four incoming low-speed channels 240A, determines framing for the channels, and converts the channels from serial to byte-wide parallel. The result is four byte-wide signals entering FIFO 526. FIFO 526 is a buffer which is used to synchronize the four signals in preparation for combining them into a single STS-12 signal. Multiplexer 524 performs the actual combination using TDM, on a byte level, to produce a single byte-wide signal equivalent in data capacity to an STS-12 signal. Parallel to serial converter 522 adds STS-12 framing to complete the STS-12 signal and converts the signal from byte-wide parallel to serial. E/O converter converts the STS-12 signal to electrical form, producing the outgoing OC-12 tributary 160A.

Converters 270 and 275 have been described in the context of OC-3 and OC-12 tributaries and low-speed channels with the same date rate as STS-3 signals, but the invention is not limited to these protocols. Alternate embodiments can vary the number, bit rate, format, and protocol of some or all of these tributaries 160. One advantage of the FDM approach illustrated in system 100 is that the system architecture is generally independent of these parameters. For example, the tributaries 160 can comprise four 2.5 Gbps data streams, 16 622 Mbps data streams, 64 155 Mbps data streams, 192 51.84 Mbps data streams, or any other bit rate or combinations of bit rates, without requiring major changes to the architecture of system 100.

In one embodiment, the tributaries 160 are at data rates which are not multiples of the STS-3 data rate. In one variant, low-speed input converter 275 demultiplexes the incoming tributary 160B into some number of parallel data streams and then stuffs null data into each resulting stream such that each stream has an STS-3 data rate. For example, if tributary 160B has a data rate of 300 Mbps, converter 275 may demultiplex the tributary into four 75 Mbps streams. Each stream is then stuffed with null data to give four 155 Mbps low-speed channels. In another variant, the speed of the rest of system 100 (specifically the modulator 640 and demodulator 620 of FIG. 4) may be adjusted to match that of the tributary 160. Low-speed output converter 270 typically will reverse the functionality of low-speed input converter 275.

Referring to FIG. 6B, modulator 640 modulates the 64 incoming low-speed channels 240B to produced 64 QAM-modulated channels which are input to the IF up-converter 642. For convenience, the QAM-modulated channels shall be referred to as IF channels because they are inputs to the IF up-converter 642. In this embodiment, each low-speed channel 240 is modulated separately to produce a single IF channel and FIG. 6B depicts the portion of modulator 640 which modulates one IF channel. Modulator 640 in its entirety would include 64 of the portions shown in FIG. 6B. For convenience, the single channel shown in FIG. 6B shall also be referred to as a modulator 640. Modulator 640 includes a FIFO 701, Reed-Solomon encoder 702, an interleaver 704, a trellis encoder 706, a digital filter 708 and a D/A converter 710 coupled in series. Modulator 640 also includes a synchronizer 712 coupled between the incoming low-speed channel 240B and the filter 708.

Modulator 640 operates as follows. FIFO 701 buffers the incoming low-speed channel. Reed-Solomon encoder 702 encodes the low-speed channel 240B according to a Reed-Solomon code. Programmable Reed-Solomon codes are preferred for maintaining very low BER (typ. lower than $10^{-12}$) with low overhead (typ. less than 10%). This is particularly relevant for optical fiber systems because they generally require low bit error rates (BER) and any slight increase of the interference or noise level will cause the BER to exceed the acceptable threshold. For example, a Reed-Solomon code of (204,188) can be applied for an error correction capability of 8 error bytes per every 204 encoded bytes.

The interleaver 704 interleaves the digital data string output by the Reed-Solomon encoder 702. The interleaving results in more robust error recovery due to the nature of trellis encoder 706. Specifically, forward error correction (FEC) codes are able to correct only a limited number of mistakes in a given block of data, but convolutional encoders such as trellis encoder 706 and the corresponding decoders tend to cause errors to cluster together. Hence, without interleaving, a block of data which contained a large cluster of errors would be difficult to recover. However, with interleaving, the cluster of errors is distributed over several blocks of data, each of which may be recovered by use of the FEC code. Convolution interleaving of depth 0 is preferred in order to minimize latency.

The trellis encoder 706 applies a QAM modulation, preferably 16 state QAM modulation, to the digital data stream output by the interleaver 704. The result typically is a complex baseband signal, representing the in-phase and quadrature (I and Q) components of a QAM-modulated signal. Trellis encoder 706 implements the QAM modulation digitally and the resulting QAM modulated signal is digitally filtered by filter 708 in order to reduce unwanted sidelobes and then converted to the analog domain by D/A converter 710. Synchronizer 712 performs clock recovery on the incoming low-speed channel 240B in order to synchronize the digital filter 708. The resulting IF channel is a pair of differential signals, representing the I and Q components of the QAM-modulated signal. In alternate embodiments, the QAM modulation may be implemented using analog techniques.

Referring to FIG. 6A, demodulator 620 reverses the functionality of modulator 640, recovering a low-speed channel 240A from an incoming IF channel (i.e., analog I and Q components in this embodiment) received from the IF down-converter 622. Demodulator 620 includes an A/D converter 720, digital Nyquist filter 722, equalizer 724, trellis decoder 726, deinterleaver 728, Reed-Solomon decoder 730 and FIFO 732 coupled in series. Demodulator 620 further includes a synchronizer 734 which forms a loop with Nyquist filter 722 and a rate converter phase-locked loop (PLL) 736 which is coupled between synchronizer 734 and FIFO 732.

Demodulator 620 operates as FIG. 6A would suggest. The A/D converter 720 converts the incoming IF channel to digital form and Nyquist filter 722, synchronized by synchronizer 734, digitally filters the result to reduce unwanted artifacts from the conversion. Equalizer 724 applies equalization to the filtered result, for example to compensate for distortions introduced in the IF signal processing. Trellis decoder 726 converts the I and Q complex signals to a digital stream and deinterleaver 728 reverses the interleaving process. Trellis decoder 726 may also determine the error rate in the decoding process, commonly referred to as the channel error rate, which may then be used to estimate the gain of system 100 as described previously. ReedSolomon decoder 730 reverses the Reed-Solomon encoding, correcting any errors which have occurred. If the code rate used results in a data rate which does not match the rate used by the low-speed channels, FIFO 732 and rate converter PLL 736 transform this rate to the proper data rate.

Referring again to transmitter 210B, IF up-converter 642 receives the 64 IF channels from modulator 640. Together, IF up-converter 642 and RF up-converter 644 combine these 64 IF channels into a single RF signal using FDM techniques. In essence, each of the IF channels (or equivalently, each of the 64 low-speed channels 240B) is allocated a different frequency band within the RF signal. The allocation of frequency bands shall be referred to as the frequency mapping, and, in this embodiment, the IF channels may also be referred to as FDM channels since they are the channels which are FDM multiplexed together. The multiplexing is accomplished in two stages. IF up-converter 642 first combines the 64 IF channels into 8 RF channels, so termed because they are inputs to the RF up-converter 644. In general, the terms "IF" and "RF" are used throughout as labels rather than, for example, indicating some specific frequency range. RF up-converter 644 them combines the 8 RF channels into the single RF signal, also referred to as the electrical high-speed channel.

Figure 7A:
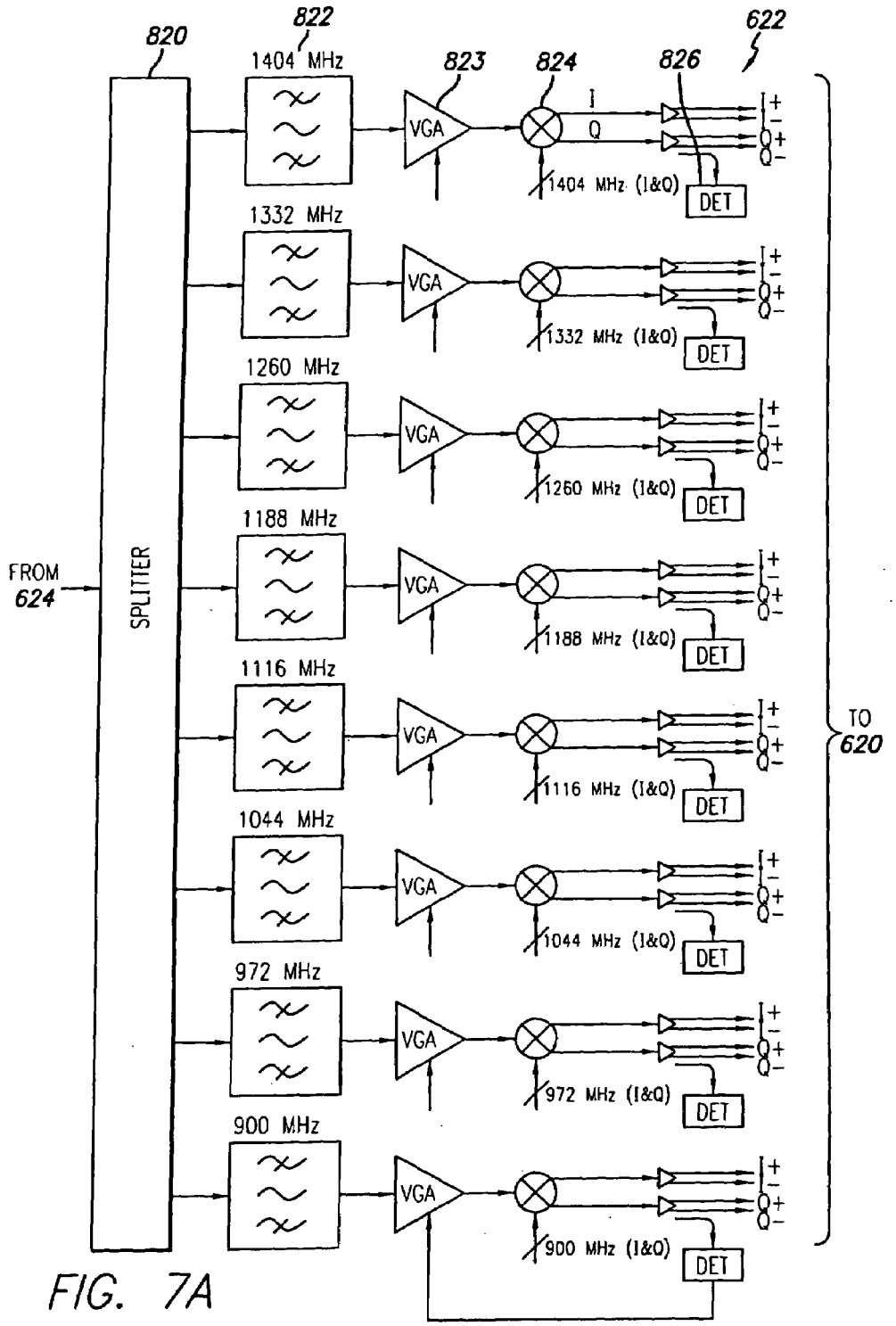
FIG. 7A is a block diagram of a preferred embodiment of IF down-converter 622.
Figure 7B:
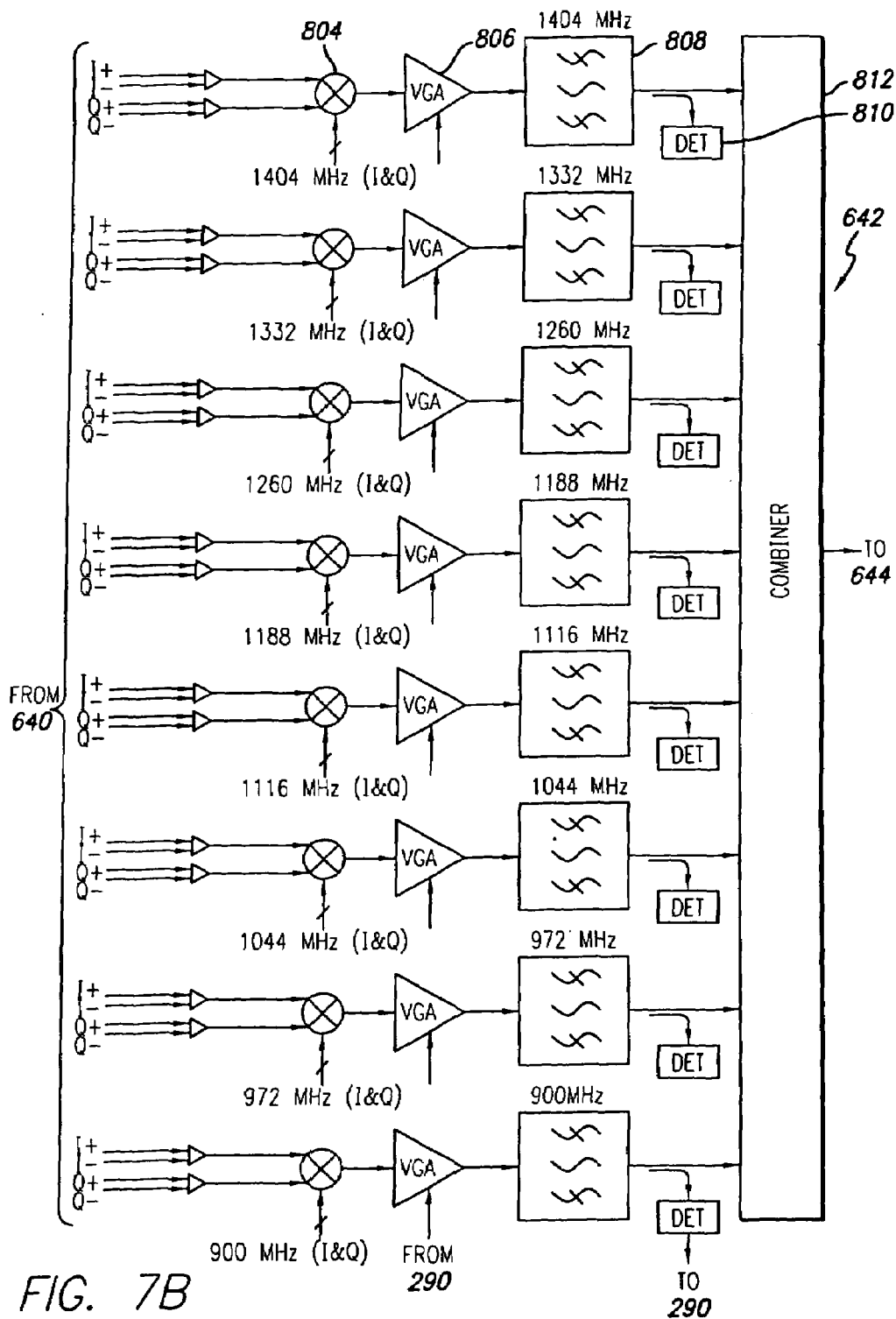
FIG. 7B is a block diagram of a preferred embodiment of IF up-converter 642.

Referring to FIG. 7B, IF up-converter 642 includes eight stages (identical in this embodiment, but not necessarily so), each of which combines 8 IF channels into a single RF channel. FIG. 7B depicts one of these stages, which for convenience shall be referred to as an IF up-converter 642. IF up-converter 642 includes eight frequency shifters and a combiner 812. Each frequency shifter includes a modulator 804, a variable gain block 806, a filter 808, and a power monitor 810 coupled in series to an input of the combiner 812.

IF up-converter 642 operates as follows. Modulator 804 receives the IF channel and also receives a carrier at a specific IF frequency (e.g., 1404 MHz for the top frequency shifter in FIG. 7B). Modulator 804 modulates the carrier by the IF channel. The modulated carrier is adjusted in amplitude by variable gain block 806, which is controlled by the corresponding control system 290, and bandpass filtered by filter 808. Power monitor 810 monitors the power of the gain-adjusted and filtered signal, and transmits the power measurements to control system 290.

In a preferred embodiment, each IF channel has a target power level based on the estimated gain due to transmission through system 100. Control system 290 adjusts the gain applied by variable gain block 806 so that the actual power level, as measured by power monitor 810, matches the target power level. The target power level may be determined in any number of ways. For example, the actual power level may be required to fall within a certain power range or be required to always stay above a minimum acceptable power. Alternately, it may be selected to maintain a minimum channel error rate or to maintain a channel error rate within a certain range. In this embodiment, variable gain block 806 implements the step of adjusting 321 the power of each low-speed channel 240.

In alternate embodiments, the power adjustment may be implemented by other elements at other locations or even at more than one location. For example, one gain block may apply a common mode gain to all low-speed channels, and another series of gain blocks at a different location may apply individual gain to each channel (i.e., differential mode gain). However, applying the gain adjustment at the location of variable gain block 806 has some advantages. For example, if the power were adjusted prior to modulator 804, where each low-speed channel consists of an I and a Q channel, care would need to be taken to ensure that the same gain was applied to both the I and Q channels in order to prevent distortion of the signal. Alternately, if the power were adjusted after combiner 812, it typically would be more difficult to adjust the power of each individual low-speed channel since combiner 812 produces a composite signal which includes multiple individual channels.

The inputs to combiner 812 are QAM-modulated IF signal at a specific frequency which have been power-adjusted to compensate for estimated gains in the rest of system 100. However, each frequency shifter uses a different frequency (e.g., ranging in equal increments from 900 MHz to 1404 Hz in this example) so combiner 812 simply combines the 8 incoming QAM-modulated signal to produce a single signal (i.e., the RF channel) containing the information of all 8 incoming IF channels. In this example, the resulting RF channel covers the frequency range of 864-1440 MHz.

Figure 8B:
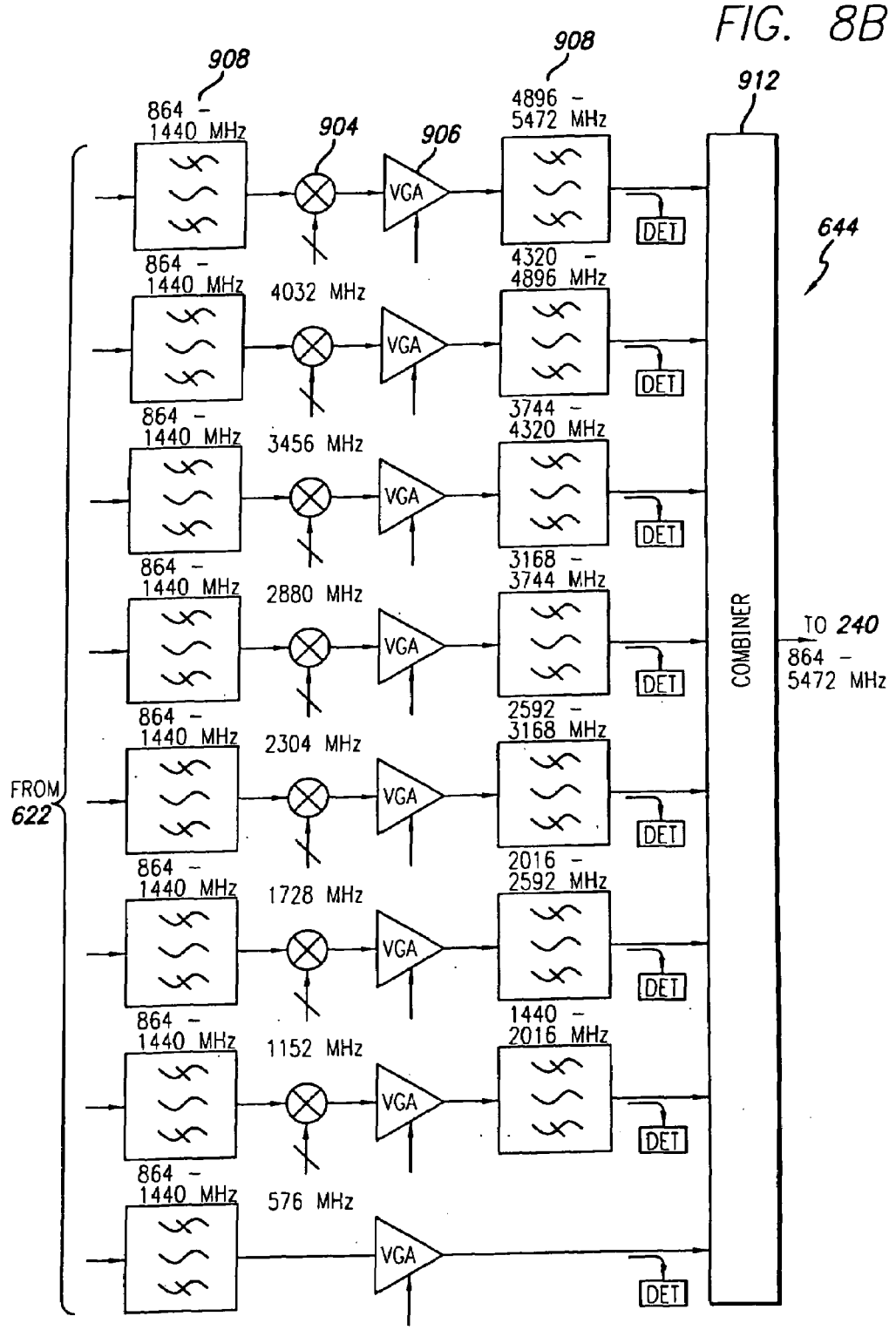
FIG. 8B is a block diagram of a preferred embodiment of RF up-converter 644.

Referring to FIG. 8B, RF up-converter 644 is structured similar to IF up-converter 642 and performs a similar function combining the 8 RF channels received from the IF up-converter 642 just as each IF up-converter combines the 8 IF channels received by it. In more detail, RF up-converter 644 includes eight frequency shifters and a combiner 912. Each frequency shifter includes a mixer 904, various gain blocks 906, and various filter 908 coupled in series to an input of the combiner 912.

RF up-converter 644 operate as follows. Mixer 904 mixes one of the RF channels with a carrier at a specific RF frequency (e.g., 4032 MHz for the top frequency shifter in FIG. 8B), thus frequency upshifting the RF channel to RF frequencies. Gain blocks 906 and filters 908 are used to implement standard amplitude adjustment and frequency filtering. For example, in FIG. 8B, one filter 908 bandpass filters the incoming RF channel and another bandpass filters the produced RF signal, both filters for suppressing artifacts outside the frequency range of interest. Each frequency shifter uses a different frequency (e.g., ranging in equal increments from 0 to 4032 MHz in this example) so combiner 912 simply combines the 8 incoming RF signals to produce the single electrical high-speed channel containing the information of all 8 incoming RF channels or, equivalently, all 64 IF channels received by IF up-converter 642. In this example, the electrical high-speed channel covers the frequency range of 864-5472 MHz.

RF down-converter 624 and IF down-converter 622 implement the reverse functionalities, splitting the RF signal into its 8 constituent RF channels and then splitting each RF channel into its 8 constituent IF channels, respectively, thus producing 64 IF channels (i.e., FDM channels) to be received by demodulator 620.

Referring to FIG. 8A, RF down-converter 624 includes a splitter 920 coupled to eight frequency shifters. Each frequency shifter includes a mixer 924, various gain blocks 926, and various filters 928 coupled in series. Splitter 920 splits the incoming electrical high-speed channel into eight different RF signals and each frequency shifter recovers a different constituent RF channel from the RF signal it receives. Mixer 924 mixes the received RF signal with a carrier at a specific RF frequency (e.g., 4032 MHz for the top frequency shifter in FIG. 8A), thus frequency downshifting the RF signal to its original IF range (e.g., 864-1440 MHz). Filter 928 then filters out this specific IF frequency range. Each frequency shifter uses a different RF frequency with mixer 924 and thus recovers a different RF channel. The output of RF down-converter 624 is the 8 constituent RF channels.

IF down-converter 622 of FIG. 7A operates similarly. It includes a splitter 820 and 8 frequency shifters, each including a bandpass filter 822, variable gain block 823, demodulator 824, and power monitor 826. Splitter 820 splits the incoming RF channel into eight signals, from which each frequency shifter will recover a different constituent IF channel. Filter 822 isolates the frequency band within the RF channel which contains the IF channels of interest. Demodulator 824 recovers the IF channel by mixing with the corresponding IF carrier. The resulting 64 IF channels are input to demodulator 620.

Variable gain block 823 and power monitor 826 control the power level of the resulting IF channel. In a preferred embodiment, each IF channel is output from IF down-converter 622 at a target power in order to enhance performance of the rest of the receiver 210A. Power monitor 826 measures the actual power of the IF channel, which is used to adjust the gain applied by variable gain block 823 in order to match the actual and target power levels. As described previously, the actual received power level for each low-speed channel may be used to estimate the gain of system 100. In IF down-converter 622, the actual receive power level may be determined by dividing the output target power for each IF channel by the gain applied by variable gain block 823 in order to maintain the output target power. In another approach, the actual receive power level may be directly measured, for example by placing a power monitor where variable gain block 823 is located.

Figure 8D:
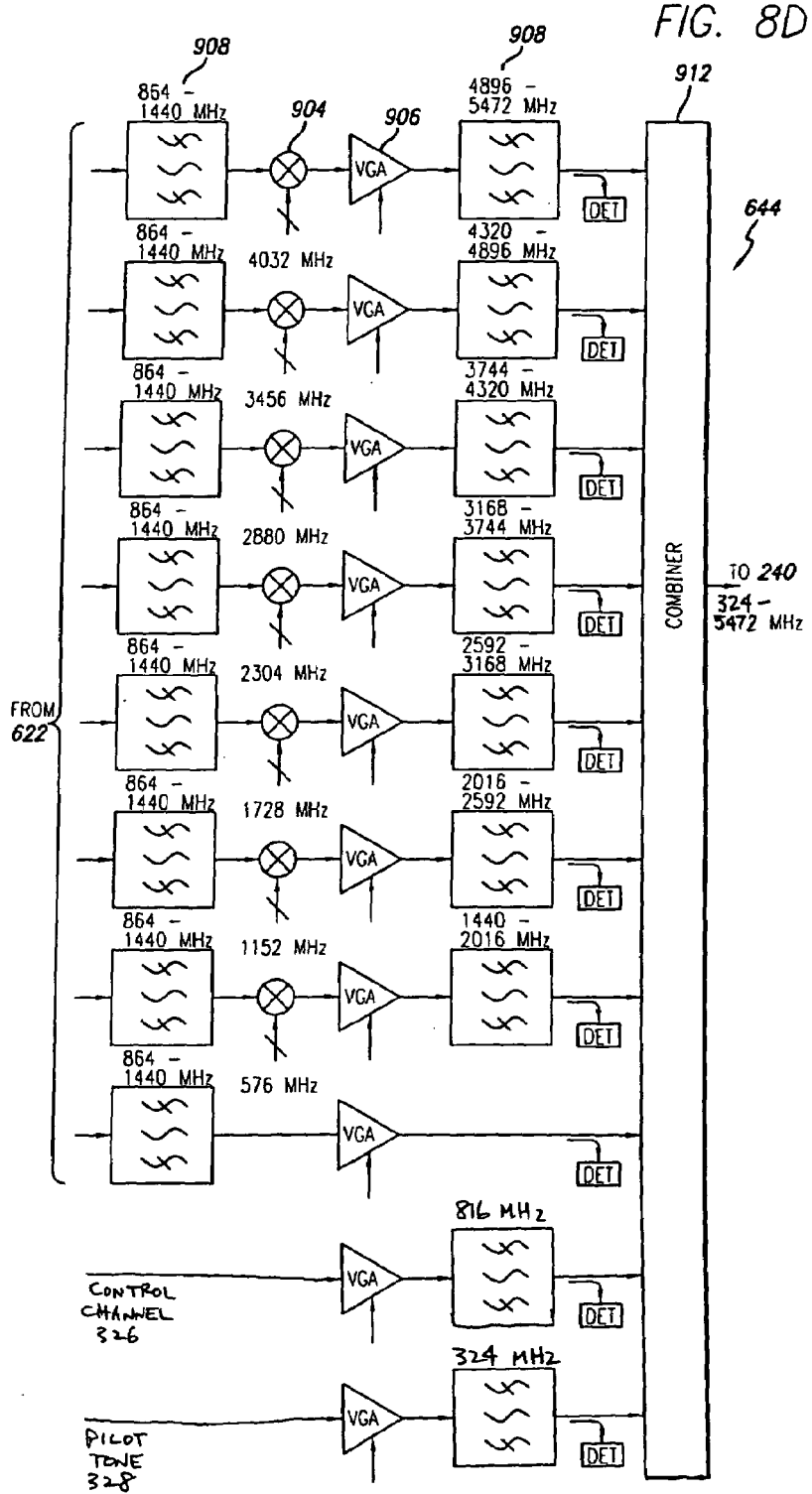
FIG. 8D is a block diagram of another preferred embodiment of RF up-converter 644.

FIGS. 8C and 8D are block diagrams of the RF down-converter 624 and RF upconverter 622, respectively, which explicitly account for the pilot tone 328 and control channel 326. The RF down-converter 624 in FIG. 8C is the same as that in FIG. 8A except for the following difference. In FIG. 8C, the splitter 920 splits the incoming signal into ten parts, rather than eight, and the RF down-converter 624 includes two additional signal paths coupled to splitter 920 to process the two additional parts. In this example, each of the additional signal paths includes a filter 928 coupled to a variable gain block 926. The first signal path with filter 928 centered at 816 MHz recovers the control channel 326 and the second with filter 928 centered at 324 MHz recovers the pilot tone 328.

The RF upconverter 644 in FIG. 8D is changed in a similar manner. Specifically, in addition to the eight signal paths leading to combiner 912 shown in FIG. 8C, the RF upconverter in FIG. 8D includes two additional signal paths. Each signal path includes a variable gain block 908 coupled in series to a filter 908. One path is for adding the control channel 326 and the other adds the pilot tone 328.

A preferred embodiment of method 300 will now be described, with reference to the bidirectional system 101 and the further details given in FIGS. 5-8. In the preferred method, the gain applied to each low-speed channel 240 is adjusted in order to optimize the channel error rate measured at the receiver 210A. Feedback occurs over fibers 104. More specifically, gain is applied to each of the low-speed channels 240 via variable gain block 806. This gain is initially selected based on an open-loop estimate. As data is transmitted from transmitter 210B(A) over fiber 104A to receiver 210A(B), trellis decoder 726 determines the channel error rate at the receiver 210A(B). The channel error rate is fed back to node 110A via the control channel on fiber 104B. In this embodiment, the control channel is a frequency modulated, alternate mark inverted, B8ZS-encoded baseband transmitted at 2 Mbps. The gain applied by variable gain block 806 is adjusted to optimize this channel error rate. One optimization approach alternates between differential mode and common mode adjustments. In the differential mode adjustment, the gain is increased for low-speed channels 240 which have unacceptable channel error rates and decreased for low-speed channels 240 with acceptable channel error rates, while keeping the overall power in all low-speed channels constant. In the common mode adjustment, if the median channel error rate is unacceptable, then the gain for all channels 240 is increased by equal increments until the median channel error rate is acceptable. In alternate embodiments, channel performance can be monitored by metrics other than the channel error rate, for example, received power, signal to noise ratio, or bit error rate.

It should be noted that many other implementations which achieve the same functionality as the devices in FIGS. 5-8 will be apparent. For example, referring to FIG. 8B, note that the bottom channel occupies the frequency spectrum from 864-1440 MHz and, therefore, no mixer 904 is required. As another example, note that the next to bottom channel is frequency up shifted from the 864-1440 MHz band to the 1440-2016 MHz. In a preferred approach, this is not accomplished in a single step by mixing with a 576 MHz signal. Rather, the incoming 864-1440 MHz signal is frequency up shifted to a much higher frequency range and then frequency down shifted back to the 1440-2016 MHz range. This avoids unwanted interference from the 1440 MHz end of the original 864-1440 MHz signal. For example, referring to FIG. 7B, in a preferred embodiment, the filters 808 are not required due to the good spectral characteristics of the signals at that point. A similar situation may apply to the other filters shown throughout, or the filtering may be achieved by different filters and/or filters placed in different locations. Similarly, amplification may be achieved by devices other than the various gain blocks shown. In a preferred embodiment, both RF down-converter 624 and RF up-converter 644 do not contain variable gain elements. As one final example, in FIGS. 4-8, some functionality is implemented in the digital domain while other functionality is implemented in the analog domain. This apportionment between digital and analog may be different for other implementations. Other variations will be apparent.

The FDM aspect of preferred embodiment 400 has been described in the context of combining 64 low-speed channels 240 into a single optical high-speed channel 120. The invention is in no way limited by this example. Different total numbers of channels, different data rates for each channel, different aggregate data rate, and formats and protocols other than the STS/OC protocol are all suitable for the current invention. In fact, one advantage of the FDM approach is that it is easier to accommodate low-speed channels which use different data rates and/or different protocols. In other words, some of the channels 240B may use data rate A and protocol X; while others may use data rate B and protocol Y, while yet others may use data rate C and protocol Z. In the FDM approach, each of these may be allocated to a different carrier frequency and they can be straightforwardly combined so long as the underlying channels are not so wide as to cause the different carriers to overlap. In contrast, in the TDM approach, each channel is allocated certain time slots and, essentially, will have to be converted to a TDM signal before being combined with the other channels.

Another advantage is lower cost. The FDM operations may be accomplished with low-cost components commonly found in RF communication systems. Additional cost savings are realized since the digital electronics such as modulator 640 and demodulator 620 operate at a relatively low data rate compared to the aggregate data rate. The digital electronics need only operate as fast as the data rate of the individual low-speed channels 240. This is in contrast to TDM systems, which require a digital clock rate that equals the aggregate transmission rate. For OC-192, which is the data rate equivalent to the high-speed channels 120 in system 100, this usually requires the use of relatively expensive gallium arsenide integrated circuits instead of silicon.

Moving further along transmitter 210B, E/O converter 240 preferably includes an optical source and an external optical modulator. Examples of optical sources include solid state lasers and semiconductor lasers. Example external optical modulators include Mach Zehnder modulators and electro-absorptive modulators. The optical source produces an optical carrier, which is modulated by the electrical high-speed channel as the carrier passes through the modulator. The electrical high-speed channel may be predistorted in order to increase the linearity of the overall system. Alternatively, E/O converter 240 may be an internally modulated laser. In this case, the electrical high-speed channel drives the laser, the output of which will be a modulated optical beam (i.e., the optical high-speed channel 120B).

The wavelength of the optical high-speed channel may be controlled using a number of different techniques. For example, a small portion of the optical carrier may be extracted by a fiber optic splitter, which diverts the signal to a wavelength locker. The wavelength locker generates an error signal when the wavelength of the optical carrier deviates from the desired wavelength. The error signal is used as feedback to adjust the optical source (e.g., adjusting the drive current or the temperature of a laser) in order to lock the optical carrier at the desired wavelength. Other approaches will be apparent.

The counterpart on the receiver 210A is O/E converter 220, which typically includes a detector such as an avalanche photo-diode or PIN-diode. In an alternate approach, O/E converter 220 includes a heterodyne detector. For example, the heterodyne detector may include a local oscillator laser operating at or near the wavelength of the incoming optical high-speed channel 120A. The incoming optical high-speed channel and the output of the local oscillator laser are combined and the resulting signal is detected by a photodetector. The information in the incoming optical high-speed channel can be recovered from the output of the photodetector. One advantage of heterodyne detection is that the thermal noise of the detector can be overcome and shot noise limited performance can be obtained without the use of fiber amplifiers.

The modularity of the FDM approach also makes the overall system more flexible and scaleable. For example, frequency bands may be allocated to compensate for fiber characteristics. For a 70 km fiber, there is typically a null around 7 GHz. With the FDM approach, this null may be avoided simply by not allocating any of the frequency bands around this null to any low-speed channel 240. As a variant, each of the frequency bands may be amplified or attenuated independently of the others, for example in order to compensate for the transmission characteristics of that particular frequency band.

Various design tradeoffs are inherent in the design of a specific embodiment of an FDM-based system 100 for use in a particular application. For example, the type of Reed Solomon encoding may be varied or other types of forward error correction codes (or none at all) may be used, depending on the system margin requirements. As another example, in one variation of QAM, the signal lattice is evenly spaced in complex signal space but the total number of states in the QAM constellation is a design parameter which may be varied. The optimal choices of number of states and other design parameters for modulator/demodulator 640/620 will depend on the particular application. Furthermore, the modulation may differ on some or all of the low speed channels. For example, some of the channels may use PSK modulation, others may use 16-QAM, others may use 4-QAM, while still others may use an arbitrary complex constellation. The choice of a specific FDM implementation also involves a number of design tradeoffs, such as the choices of intermediate frequencies, whether to implement components in the digital or in the analog domain, and whether to use multiple stages to achieve the multiplexing.

As a numerical example, in one embodiment, a (187,204) Reed-Solomon encoding may be used with a rate 3/4 16-QAM trellis code. The (187,204) Reed-Solomon encoding transforms 187 bytes of data into 204 bytes of encoded data and the rate 3/4 16-QAM trellis code transforms 3 bits of information into a single 16-QAM symbol. In this example, a single low-speed channel 240B, which has a base data rate of 155 Mbps would require a symbol rate of 155 Mbps×(204/187)×(⅓)=56.6 Megasymbols per second. Including an adequate guard band, a typical frequency band would be about 72 MHz to support this symbol rate. Suppose, however, that it is desired to decrease the bandwidth of each frequency band. This could be accomplished by changing the encoding and modulation. For example, a (188,205) Reed-Solomon code with a rate 5/6 64-QAM trellis code would require a symbol rate of 155 Mbps×(205/188)×(⅕)=33.9 Megasymbols per second or 43 MHz frequency bands, assuming proportional guard bands. Alternately, if 72 MHz frequency bands were retained, then the data rate could be increased.

As another example, an optical modulator 240 with better linearity will reduce unwanted harmonics and interference, thus increasing the transmission range of system 100. However, optical modulators with better linearity are also more difficult to design and to produce. Hence, the optimal linearity will depend on the particular application. An example of a system-level tradeoff is the allocation of signal power and gain between the various components. Accordingly, many aspects of the invention have been described in the context of the preferred embodiment of FIGS. 3-8 but it should be understood that the invention is not to be limited by this specific embodiment.

It should be noted that the embodiments described above are exemplary only and many other alternatives will be apparent. For example, in the embodiments discussed above, the low-speed channels 240 were combined into an electrical high-speed channel using solely frequency division multiplexing. For example, each of the 64 low-speed channels 240B was effectively placed on a carrier of a different frequency and these 64 carriers were then effectively combined into a single electrical high-speed channel solely on the basis of different carrier frequencies. This is not meant to imply that the invention is limited solely to frequency division multiplexing to the exclusion of all other approaches for combining signals. In fact, in alternate embodiments, other approaches may be used in conjunction with frequency division multiplexing. For example, in one approach, 64 low-speed channels 240B may be combined into a single high-speed channel 120 in two stages, only the second of which is based on frequency division multiplexing. In particular, 64 low-speed channels 240B are divided into 16 groups of 4 channels each. Within each group, the 4 channels are combined into a single signal using 16-QAM (quadrature amplitude modulation). The resulting QAM-modulated signals are frequency-division multiplexed to form the electrical high-speed channel.

As another example, it should be clear that the tributaries 160 may themselves be combinations of signals. For example, some or all of the OC-3/OC-12 tributaries 160 may be the result of combining several lower data rate signals, using either frequency division multiplexing or other techniques. In one approach, time division multiplexing may be used to combine several lower data rate signals into a single OC-3 signal, which serves as a tributary 160.

As a final example, frequency division multiplexing has been used in all of the preceding examples as the method for combining the low-speed channels 240 into a high-speed channel 120 for transmission across optical fiber 104. Other approaches could also be used. For example, the low-speed channels 240 could be combined using wavelength division multiplexing, in which the combining of channels occurs in the optical domain rather than in the electrical domain. In this approach, the low-speed channels are optical in form, the optical power of each low-speed channel is adjusted, and the power-adjusted optical low-speed channels are combined using wavelength division multiplexing rather than frequency division multiplexing. Many of the principles described above may also be applied to the wavelength division multiplexing approach. Although the invention has been described in considerable detail with reference to certain preferred embodiments thereof, other embodiments are possible. Therefore, the scope of the appended claims should not be limited to the description of the preferred embodiments contained herein.

What is claimed is:

1. In an optical fiber communications system including an optical fiber, a method for compensating for dispersion effects in the optical fiber, the method comprising:
   receiving at least two low-speed channels, each low-speed channel allocated a different frequency band of an optical fiber communications system for transmission across the communications system;
   for each low-speed channel, estimating attenuation caused by dispersion resulting from transmission of the low-speed channel across the optical fiber in the frequency band allocated to the low-speed channel;
   adjusting a power of each low-speed channel to compensate for the estimated attenuation caused by dispersion; and
   frequency division multiplexing the power-adjusted low-speed channels to produce an electrical high-speed channel for transmission across the communications system.

2. The method of claim 1 wherein the step of adjusting a power of each low-speed channel comprises applying a gain to each low-speed channel which is equal in magnitude to the estimated attenuation for that low-speed channel.

3. The method of claim 2 wherein the step of adjusting a power of each low-speed channel comprises applying a constant gain to each low-speed channel which is equal in magnitude to the estimated attenuation at a center frequency of the frequency band allocated to the low-speed channel.

4. The method of claim 1 wherein the step of adjusting a power of each low-speed channel comprises applying a gain ramp to the low-speed channels.

5. The method of claim 1 wherein the step of estimating an attenuation caused by dispersion comprises estimating an attenuation caused by chromatic dispersion.

6. The method of claim 1 wherein the step of estimating an attenuation caused by dispersion comprises estimating an attenuation caused by polarization mode dispersion.

7. An optical fiber communications system for transmitting at least two low speed channels across the communications system, the communications system comprising:
   a variable gain block for adjusting a power of each low-speed channel to compensate for an estimated attenuation caused by dispersion resulting from transmission of the low-speed channel across an optical fiber in a frequency band allocated to the low-speed channel; and
   a FDM multiplexer coupled to the variable gain block for combining the power-adjusted low-speed channels into an electrical high-speed channel suitable for transmission across the communications system.

8. The communications system of claim 7 wherein the variable gain block applies a gain to each low-speed channel which is equal in magnitude to the estimated attenuation for that low-speed channel.

9. The communications system of claim 8 wherein the variable gain block applies a constant gain to each low-speed channel which is equal in magnitude to the estimated attenuation at a center frequency of the frequency band allocated to the low-speed channel.

10. The communications system of claim 7 wherein the variable gain block applies a gain ramp to the low-speed channels.

11. The communications system of claim 7 wherein the variable gain block is for adjusting a power of each low-speed channel to compensate for an estimated attenuation caused by chromatic dispersion.

12. The communications system of claim 7 wherein the variable gain block is for adjusting a power of each low-speed channel to compensate for an estimated attenuation caused by polarization mode dispersion.

* * * * *